(12) United States Patent
Seo et al.

(10) Patent No.: US 10,324,834 B2
(45) Date of Patent: Jun. 18, 2019

(54) STORAGE DEVICE MANAGING MULTI-NAMESPACE AND METHOD OF OPERATING THE STORAGE DEVICE

(71) Applicant: SAMSUNG ELECTRONICS CO., LTD., Suwon-si, Gyeonggi-do (KR)

(72) Inventors: Dong-Young Seo, Suwon-si (KR); Hong-Moon Wang, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 85 days.

(21) Appl. No.: 15/611,364

(22) Filed: Jun. 1, 2017

(65) Prior Publication Data
US 2018/0121344 A1 May 3, 2018

(30) Foreign Application Priority Data
Oct. 31, 2016 (KR) .......................... 10-2016-0143424

(51) Int. Cl.
*G06F 12/00* (2006.01)
*G06F 12/02* (2006.01)

(52) U.S. Cl.
CPC .. *G06F 12/0246* (2013.01); *G06F 2212/1016* (2013.01); *G06F 2212/1044* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 6,408,298 B1* | 6/2002 | Van | ................... | G06F 17/30067 |
| 8,635,326 B1* | 1/2014 | Chaganti | ................. | H04L 45/60 |
| | | | | 709/223 |
| 8,914,429 B2* | 12/2014 | Pitts | .................. | G06F 17/30067 |
| | | | | 707/822 |
| 9,003,071 B2 | 4/2015 | Liu | | |
| 9,250,817 B2 | 2/2016 | Flynn et al. | | |
| 9,294,567 B2 | 3/2016 | Hussain et al. | | |
| 9,524,300 B2* | 12/2016 | Rajpal | ............... | G06F 17/30091 |
| 2010/0191779 A1* | 7/2010 | Hinrichs | ............... | G06F 3/0605 |
| | | | | 707/822 |

(Continued)

OTHER PUBLICATIONS

Cox, Jason, "Security for NVMe", Flash Memory Summit, Aug. 11, 2015.

(Continued)

*Primary Examiner* — John A Lane
(74) *Attorney, Agent, or Firm* — F. Chau & Associates, LLC

(57) ABSTRACT

A method of operating a storage device managing a multi-namespace includes storing first mapping information including a mapping between a first logical address space and a first physical address space to a mapping table, in response to a request to create a first namespace, the first logical address space being allocated to the first namespace, and storing second mapping information including a mapping between a second logical address space and a second physical address space to the mapping table, in response to a request to create a second namespace, the second logical address space being allocated to the second namespace and being contiguous to the first logical address space.

17 Claims, 27 Drawing Sheets

(56) References Cited

U.S. PATENT DOCUMENTS

| | | |
|---|---|---|
| 2012/0311298 A1 | 12/2012 | Post et al. |
| 2015/0006663 A1 | 1/2015 | Huang |
| 2015/0227316 A1 | 8/2015 | Warfield et al. |
| 2015/0317088 A1 | 11/2015 | Hussain et al. |
| 2015/0317091 A1 | 11/2015 | Hussain et al. |
| 2015/0363327 A1 | 12/2015 | Chaitanya et al. |
| 2016/0070652 A1 | 3/2016 | Sundararaman et al. |
| 2016/0077740 A1 | 3/2016 | Hussain et al. |
| 2016/0342463 A1* | 11/2016 | Oshima ............... G06F 11/1004 |
| 2017/0351431 A1* | 12/2017 | Dewitt ................. G06F 3/0605 |
| 2018/0260334 A1* | 9/2018 | Asano ................... G06F 3/0631 |

OTHER PUBLICATIONS

"NVM Express (TM): Unlock the Potential", Flash Memory Summit 2014, Santa Clara, CA.

* cited by examiner

STORAGE DEVICE MANAGING MULTI-NAMESPACE AND METHOD OF OPERATING THE STORAGE DEVICE

CROSS-REFERENCE TO RELATED APPLICATION

This application claims the benefit of and priority to Korean Patent Application No. 10-2016-0143424, filed on Oct. 31, 2016, in the Korean Intellectual Property Office, the disclosure of which is incorporated by reference in its entirety herein.

BACKGROUND

1. Technical Field

The inventive concept relates to a storage device, and more particularly, to a storage device capable of managing a multi-namespace, and a method of operating the storage device.

2. Discussion of Related Art

Flash memory, which is non-volatile memory, can maintain data stored therein even though powered off. Flash memory storage devices, such as solid state drives (SSDs) and memory cards, are used to store or transfer a large amount of data. A single storage device can support a namespace function, which allows another device to perceive the single storage device as a plurality of devices.

SUMMARY

According to an exemplary embodiment of the inventive concept, there is provided a method of operating a storage device managing a multi-namespace, the method including: storing first mapping information including a mapping between a first logical address space and a first physical address space to a mapping table, in response to a request to create a first namespace, the first logical address space being allocated to the first namespace; and storing second mapping information including a mapping between a second logical address space and a second physical address space to the mapping table, in response to a request to create a second namespace, the second logical address space being allocated to the second namespace and being contiguous to the first logical address space.

According to an exemplary embodiment of the inventive concept, there is provided a method of operating a storage device managing a multi-namespace, the method including: respectively allocating first and second logical address spaces contiguous to each other to first and second namespaces and storing first and second mapping information regarding the respective first and second logical address spaces to a mapping table, in response to a request to create the first and second namespaces; and relocating the first mapping information and the second mapping information in the mapping table, in response to a request to delete the first namespace.

According to an exemplary embodiment of the inventive concept, there is provided a method of operating a storage device managing a multi-namespace, the method including: managing a mapping table such that first, second, and third namespaces have contiguous logical address spaces; and updating the mapping table such that the first namespace and the third namespace have contiguous logical address spaces, in response to a request to delete the second namespace.

According to an exemplary embodiment of the inventive concept, there is provided a storage device managing a multi-namespace, the storage device including: a non-volatile memory; and a controller, which dynamically creates a first namespace by allocating a first logical address space to the first namespace and stores first mapping information of the first namespace to a mapping table, in response to a request to create the first namespace, the first logical address space being contiguous to a logical address space of a previously created namespace.

According to an exemplary embodiment of the inventive concept, there is provided a storage device managing a multi-namespace, the storage device including a non-volatile memory and a controller. The non-volatile memory has a mapping table storing first mapping information including a mapping between a first logical address space and a first physical address space and second mapping information including a mapping between a second logical address space and a second physical address space. The first logical address space is allocated to a first namespace. The second logical address space is allocated to a second namespace. The second logical address space is contiguous to the first logical address space. The controller is configured to relocate the first and second mapping information in the mapping table, in response to a request from a host to delete the first namespace.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EXEMPLARY EMBODIMENTS

Hereinafter, embodiments of the inventive concept will be described in detail with reference to the accompanying drawings.

Figure 1:
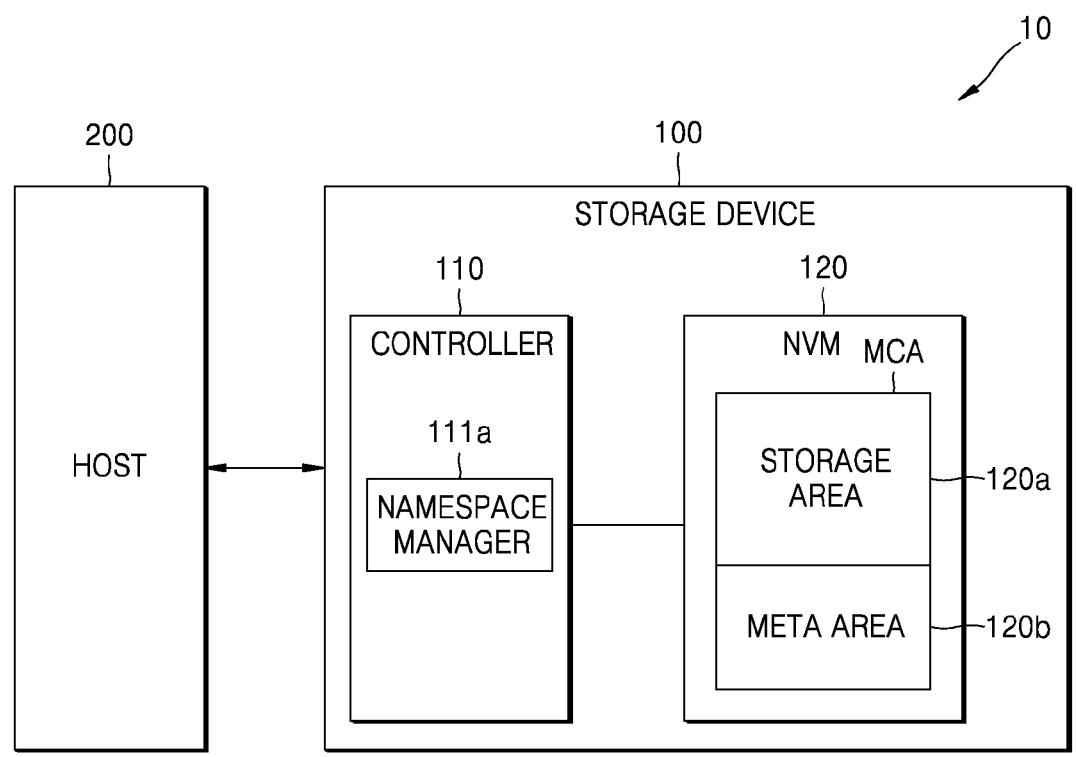
FIG. 1 is a block diagram illustrating a storage system according to an exemplary embodiment.

FIG. 1 is a block diagram illustrating a storage system 10 according to an exemplary embodiment of the inventive concept.

Referring to FIG. 1, the storage system 10 includes a storage device 100 and a host 200 (e.g., a host device), and the storage device 100 includes a controller 110 and a non-volatile memory (NVM) 120. The controller 110 may control the non-volatile memory 120 such that data stored in the non-volatile memory 120 is read or data is written to the non-volatile memory 120 in response to a write/read request from the host 200.

In an embodiment, the storage device 100 supports a namespace function. Herein, the term "namespace" may be defined as a quantity of the non-volatile memory 120, which is formatted into logical blocks, and a namespace having a size of n is a collection of logical blocks having logical block addresses from 0 to n−1. The term "namespace function" refers to a function of providing a plurality of logical devices from one physical device. Specifically, a namespace function is a technique of dividing the storage device 100 into a plurality of namespaces and allocating a unique logical block address (LBA) to each namespace. In an embodiment, the host 200 perceives the single storage device 100 as being multiple storage devices, where a first one of the multiple storage devices corresponds to a first set of the LBAs, a second one of the multiple storage devices corresponds to a second set of the LBAs, and the first set of LBAs is different from the second set of the LBAs.

The storage device 100 may manage a multi-namespace and thus be described as providing a multi-namespace function. Specifically, the storage device 100 may dynamically create a plurality of namespaces. The storage device 100 managing the multi-name space may dynamically delete some of the plurality of created namespaces. For example, the storage device 100 may be a non-volatile memory express solid state drive (NVMe SSD) device.

The controller 110 includes a namespace manager 111a, and the namespace manager 111a may manage operations of dynamically creating and deleting a namespace by using a single mapping table. The controller 110 may be implemented by a processor of the storage device 100. In an embodiment, the namespace manager 111a updates a mapping table during operations of creating and deleting a namespace so that a plurality of namespaces have contiguous logical address spaces. In an embodiment, the namespace manager 111a is realized by a flash translation layer (FTL). Hereinafter, specific operations of the namespace manager 111a will be described.

In an embodiment, the namespace manager 111a dynamically creates a namespace based on a user request. For example, the namespace manager 111a can dynamically create a namespace in response to a namespace creation request from the host 200. In an embodiment, the namespace manager 111a creates a namespace by allocating a logical address space, which is contiguous to a logical address space of a previously created namespace, to a namespace to be newly created. For example, if a first logical address space was previously created for a first namespace, and a second namespace is to be created in response to the creation request, a second logical address space contiguous to the first logical address space is created and assigned to the second namespace. In addition, the namespace manager 111a may update mapping information regarding a logical address space and a physical address space of the created namespace. The physical address space may correspond to actual physical locations or blocks within the memory device 120.

In addition, the namespace manager 111a may dynamically delete a namespace based on a user request, that is, in response to a namespace deletion request from the host 200. In an embodiment, the namespace manager 111a deletes a namespace by relocating mapping information in a mapping table such that namespaces remaining after the deletion operation have logical address spaces contiguous to each other. For example, if the mapping table refers to a first namespace having a first logical address space starting at a first starting value and ending at a first ending value, refers to a second namespace having a second logical address space starting at a second starting value adjacent the first ending value and ending at a second ending value, a third namespace having a third logical address space starting at a third starting value adjacent the second ending value and ending at a third ending value, and the second namespace is deleted, in one embodiment, the first ending value is changed to the second ending value or the third starting value is changed to the second starting value so that the first and third logical address spaces remain contiguous. In addition, the namespace manager 111a may perform an unmapping operation on mapping information of a namespace to be deleted, in the mapping table. In an embodiment, the unmapping operation sets a flag in the mapping information that indicates the namespace has been unmapped, and when the mapping information needs to be assigned to a new namespace, the flag is cleared.

The non-volatile memory 120 includes a memory cell array MCA, and the memory cell array MCA includes a storage area 120a for storing user data and a meta area 120b for storing metadata. In an embodiment, the memory cell array MCA includes a plurality of flash memory cells. For example, the plurality of flash memory cells may be NAND flash memory cells. However, the inventive concept is not limited thereto, and the memory cells may be resistive memory cells such as resistive RAM (ReRAM), phase change RAM (PRAM), and magnetic RAM (MRAM).

In an embodiment, the meta area 120b stores a mapping table in which mapping information including a mapping between a logical address and a physical address is stored. When power is applied to the storage device 100 or when the storage system 10 is booted, the mapping table stored in the non-volatile memory 120 is loaded into volatile memory (for example, DRAM or SRAM) internal or external to the controller 110. The namespace manager 111a may update the mapping table loaded into the volatile memory, according to the operations of dynamically creating and deleting a namespace.

The host 200 may communicate with the storage device 100 through various interfaces. In an embodiment, the host 200 is capable of transferring a read command or a write command to the storage device 100 to control a data processing operation, for example, a data read operation or a data write operation of the storage device 100. In this embodiment, the host 200 further transfers a namespace management command such as namespace creation and deletion requests or a trim command for creating a free block in the non-volatile memory 120, to the storage device 100. In an embodiment, the host 200 is an application processor (AP). In an embodiment, the host 200 is realized by a system on a chip (SoC).

The storage system 10 may be realized by, for example, a personal computer (PC), a data server, a network-attached storage (NAS), an internet-of-things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book reader, or a wearable device.

In an exemplary embodiment, the storage device 100 is an internal memory embedded in an electronic device. For example, the storage device 100 may be an SSD, an embedded universal flash storage (UFS) memory device, or an embedded multimedia card (eMMC). In an embodiment, the storage device 100 is an external memory detachable from an electronic device. For example, the storage device 100 may be a UFS memory card, a compact flash (CF) card, a secure digital (SD) card, a micro-secure digital (micro-SD) card, a mini-secure digital (mini-SD) card, an extreme digital (xD) card, or a memory stick.

Figure 2A:
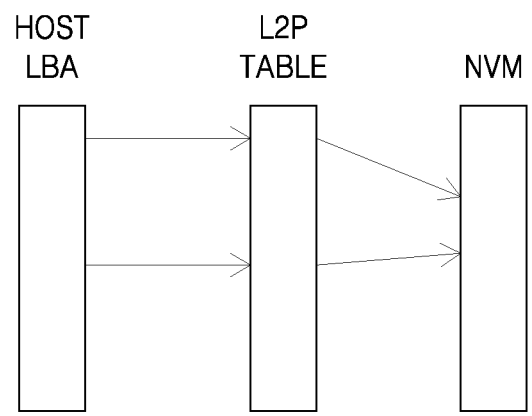
FIG. 2A illustrates an L2P mapping operation of a storage device not supporting a namespace function, according to a comparative embodiment.

FIG. 2A illustrates an L2P mapping operation of a storage device not supporting a namespace function, according to a comparative embodiment.

Referring to FIG. 2A, a host LBA is converted into a physical address of non-volatile memory (NVM) by using information within a logical to physical (L2P) mapping table managed by an FTL of a storage device. When the storage device does not support a namespace function, the L2P mapping table needs to be able to map all host LBAs to physical address spaces of the non-volatile memory. Here, the size of the L2P mapping table is proportional to address spaces of LBAs for mapping.

Figure 2B:
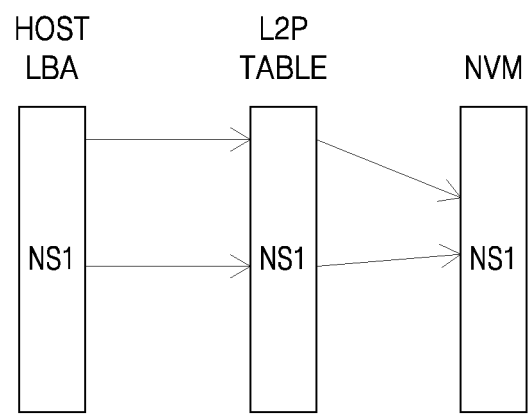
FIG. 2B illustrates an L2P mapping operation of a storage device supporting a namespace function, according to an exemplary embodiment of the inventive concept.

FIG. 2B illustrates an L2P mapping operation of a storage device supporting a namespace function, according to an exemplary embodiment of the inventive concept.

Referring to FIG. 2B, when a namespace NS1 is created in a storage device (for example, the storage device 100 of FIG. 1), one logical device is provided from one physical device. Thus, the size of the namespace NS1 may be equal to the size of a whole logical address space provided by the storage device. Here, a logical address space managed by an L2P mapping table for the namespace NS1 coincides with a physical address space of a non-volatile memory. Thus, the size of the L2P mapping table may be equal to that of FIG. 2A.

Figure 3A:
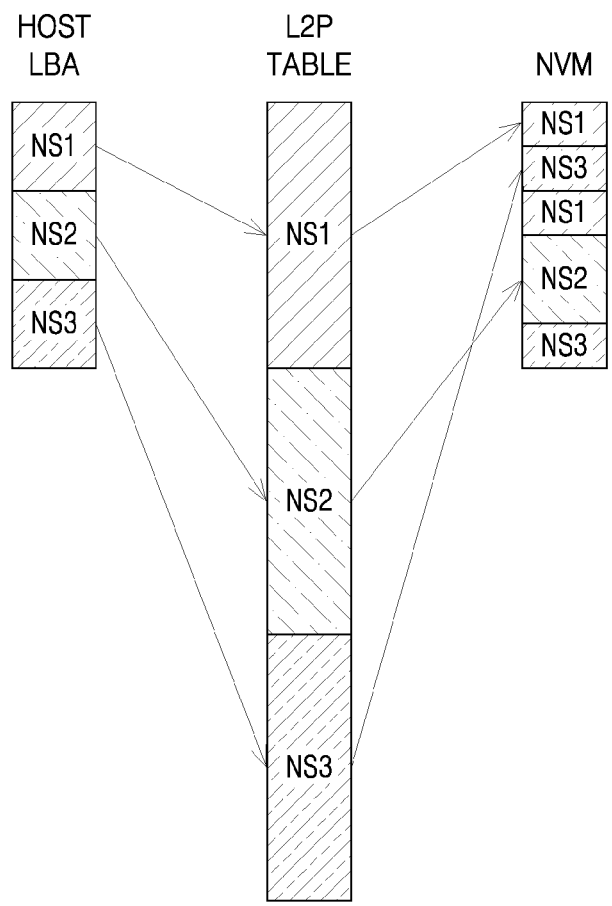
FIG. 3A illustrates an L2P mapping operation of a storage device supporting a multi-namespace function, according to a comparative embodiment.

FIG. 3A illustrates an L2P mapping operation of a storage device supporting a multi-namespace function, according to a comparative embodiment.

Referring to FIG. 3A, when three namespaces NS1 to NS3 are created in a storage device, three logical devices are provided from one physical device. When a mapping table is managed for each namespace NS1, NS2, or NS3, each namespace may have a maximum address space. Thus, since an L2P mapping table for each namespace may use a maximum size of capacity, the amounts of L2P mapping tables for the three namespaces NS1 to NS3 are significantly increased. Thus, a storage space of a non-volatile memory for storing the L2P mapping tables, and a storage space of memory (for example, DRAM) inside a controller of the storage device for loading the L2P mapping tables are significantly increased.

Figure 3B:
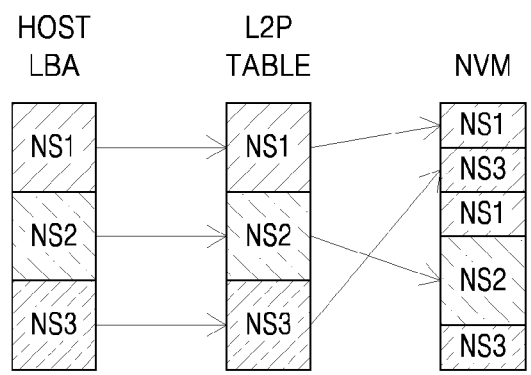
FIG. 3B illustrates an L2P mapping operation of a storage device supporting a multi-namespace function, according to an exemplary embodiment of the inventive concept.

FIG. 3B illustrates an L2P mapping operation of a storage device supporting a multi-namespace function, according to an exemplary embodiment of the inventive concept.

Referring to FIG. 3B, three namespaces NS1 to NS3 are created in a storage device (for example, the storage device 100 of FIG. 1). According to this embodiment, logical address spaces and physical address spaces of the namespaces NS1 to NS3 are mapped to each other in a 1:1 manner. Thus, a whole logical address space provided by the namespaces NS1 to NS3 is less than or equal to a physical address space of non-volatile memory. In addition, according to this embodiment, the three namespaces NS1 to NS3 may share one mapping table.

A partial address space (for example, LBA0 to LBA3) of the whole logical address space may be allocated to a first namespace NS1; a partial address space (for example, LBA4 to LBA7) of the whole logical address space, which is contiguous to the address space allocated to the first namespace NS1, may be allocated to a second namespace NS2; and a partial address space (for example, LBA8 to LBA11) of the whole logical address space, which is contiguous to the address space allocated to the second namespace NS2, may be allocated to a third namespace NS3. Thus, a logical address space managed by the L2P mapping table for the first to third namespaces NS1 to NS3 coincides with a physical address space of the non-volatile memory. Therefore, the size of the L2P mapping table may be equal to that of FIG. 2B.

Figure 4:
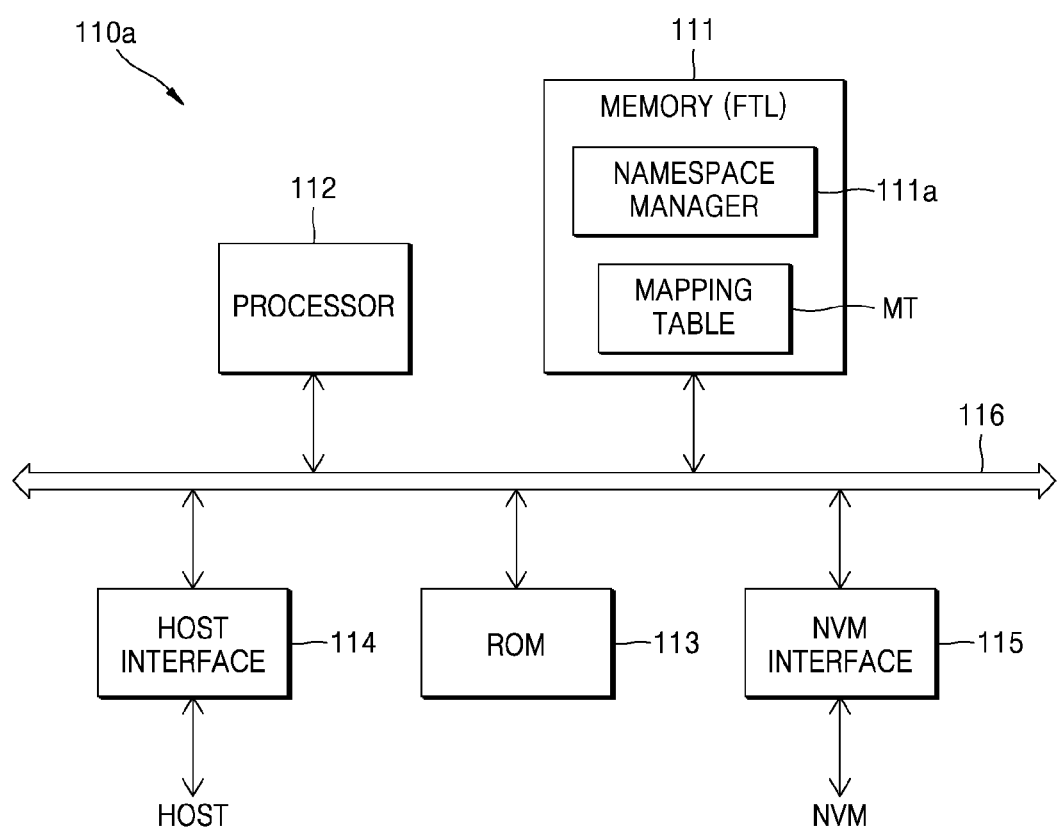
FIG. 4 is a block diagram illustrating an example of a controller of FIG. 1, according to an exemplary embodiment of the inventive concept.

FIG. 4 is a block diagram illustrating an example (controller 110a) of the controller of FIG. 1, according to an exemplary embodiment of the inventive concept.

Referring to FIGS. 1 and 4, the controller 110a includes a memory 111, a processor 112, a read-only memory (ROM) 113, a host interface 114, and a non-volatile memory interface 115, and these components may communicate with each other through a bus 116. In this embodiment, the namespace manager 111a may be realized by software or firmware, and may be loaded into the memory 111. The processor 112 may include a central processing unit or a microprocessor, and may control all operations of the controller 110a.

The memory 111 may be operated by the control of the processor 112, and may be used as buffer memory or a cache memory. For example, the memory 111 may be realized by a dynamic random access memory (DRAM), a static random access memory (SRAM), a PRAM, or a flash memory. In this embodiment, an FTL may be loaded into the memory 111, and may include the namespace manager 111a. Specifically, the FTL may include firmware, and may further include a wear-leveling module, a bad block management module, a garbage collection module, an encryption/decryption module, or a mapping table management module, depending upon functions realized by the firmware.

In an embodiment, the namespace manager 111a dynamically creates or deletes a namespace in response to a namespace creation or deletion request received from the host 200. In an embodiment, a mapping table MT includes mapping information for converting a logical address into a physical address, and may be loaded from the meta area 120b of the non-volatile memory 120 into the memory 111. In an embodiment, the namespace manager 111a allocates a logical address space to a namespace and updates mapping information regarding the created namespace to the mapping table MT, in response to the namespace creation request. In an embodiment, the namespace manager 111a relocates mapping information for a namespace to be deleted, in the mapping table MT, and performs an unmapping operation on the mapping information of the namespace to be deleted, in response to the namespace deletion request. In an embodiment, the namespace manager 111a performs an unmapping operation on some of the mapping information stored in the mapping table MT, in response to a trim command received from the host 200.

The ROM 113 may store code data required for an initial booting. The host interface 114 may provide an interface between the host 200 and the controller 110a, and may provide, for example, an interface according to universal serial bus (USB), multimedia card (MMC), PCI express (PCI-E), AT attachment (ATA), serial AT attachment (SATA), parallel AT attachment (PATA), small computer system interface (SCSI), serial attached SCSI (SAS), enhanced small disk interface (ESDI), or integrated drive electronics (IDE). The non-volatile memory interface 115 may provide an interface between the controller 110a and the non-volatile memory 120. For example, an L2P mapping table, block information, written data, and read data may be sent and received between the controller 110a and the non-volatile memory 120 through the non-volatile memory interface 115.

Figure 5:
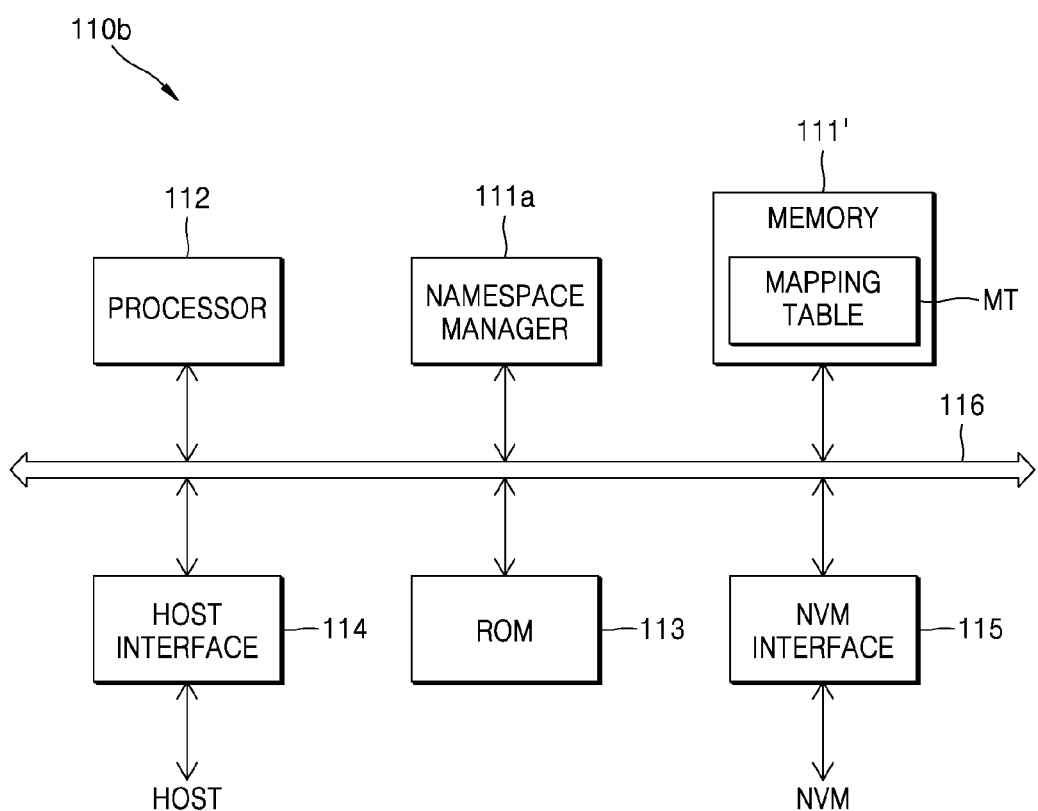
FIG. 5 is a block diagram illustrating another example of a controller of FIG. 1, according to an exemplary embodiment of the inventive concept.

FIG. 5 is a block diagram illustrating another example (controller 110b) of the controller 110 of FIG. 1, according to an exemplary embodiment of the inventive concept.

Referring to FIG. 5, the controller 110b includes the namespace manager 111a, a memory 111', the processor 112, the ROM 113, the host interface 114, and the non-volatile memory interface 115, and these components may communicate with each other through the bus 116. The controller 110b is a modification of the controller 110a of FIG. 4, and repeated descriptions thereof will be omitted. In this embodiment, the namespace manager 111a is realized by hardware (e.g., a processor), and operations of the namespace manager 111a may be substantially the same as those in the embodiment of FIG. 4.

Figure 6:
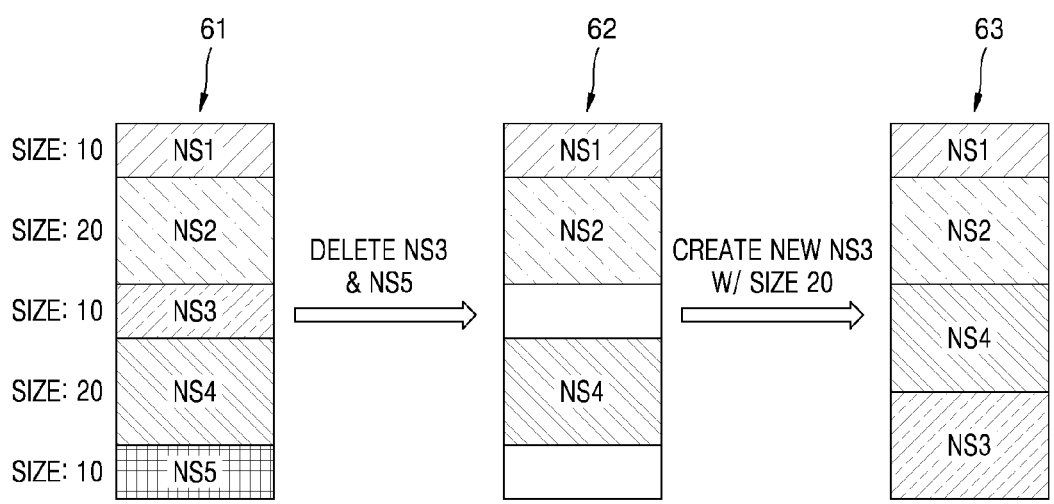
FIG. 6 illustrates operations of dynamically creating and deleting a namespace, which are performed in a storage device of FIG. 1, according to an exemplary embodiment of the inventive concept.

FIG. 6 illustrates operations of dynamically creating and deleting a namespace, which are performed in the storage device 100 of FIG. 1, according to an exemplary embodiment of the inventive concept.

Referring to FIGS. 1 and 6, the namespace manager 111a sequentially creates first to fifth namespaces NS1 to NS5 in a logical address space 61 of the storage device 100. For example, the logical address space 61 may have a size of 70 and may include LBA0 to LBA69. For example, the first namespace NS1 may have a size of 10, the second namespace NS2 may have a size of 20, the third namespace NS3 may have a size of 10, the fourth namespace NS4 may have a size of 20, and the fifth namespace NS5 may have a size of 10. Here, the logical address space 61 is mapped to a physical address space of the non-volatile memory 120 in a 1:1 manner, and may be equal to or less than storage capacity of the non-volatile memory 120.

According to this embodiment, the first to fifth namespaces NS1 to NS5 have logical address spaces contiguous to each other, and thus, there is no free space between the first to fifth namespaces NS1 to NS5. Specifically, the namespace manager 111a sequentially allocates logical address spaces to the first to fifth namespaces NS1 to NS5, according to a creation order of the first to fifth namespaces NS1 to NS5.

For example, a first logical address space from LBA0 to LBA9 may be allocated to the first namespace NS1 having a size of 10, a second logical address space from LBA10 to LBA29 may be allocated to the second namespace NS2 having a size of 20, and a third logical address space from LBA30 to LBA39 may be allocated to the third namespace NS3 having a size of 10. Next, a fourth logical address space from LBA40 to LBA59 may be allocated to the fourth namespace NS4 having a size of 20, and a fifth logical address space from LBA60 to LBA69 may be allocated to the fifth namespace NS5 having a size of 10.

In the example shown in FIG. 6, the storage device 100 receives a request (e.g., via one or more commands) to delete the third and fifth namespaces NS3 and NS5 from the host 200. In an embodiment, the host 200 sends a command to the storage device 100 that identifies one or more namespaces to delete. The namespace manager 111a may dynamically delete the third and fifth namespaces NS3 and NS5 from a logical address space 62, in response to the received deletion request. Specifically, the namespace manager 111a may perform an unmapping operation on the third and fifth logical address spaces, which are allocated to the third and fifth namespaces NS3 and NS5, in the logical address space 62. Thus, the host 200 may determine that the third and fifth namespaces NS3 and NS5 have been deleted, as shown in a logical address space 62.

According to this embodiment, after the deletion of the third and fifth namespaces NS3 and NS5, mapping information of the fourth namespace NS4 is relocated such that the first, second, and fourth namespaces NS1, NS2, and NS4 have logical address spaces contiguous to each other. Specifically, the mapping information of the fourth namespace NS4 may be relocated to a logical address space from LBA30 to LBA49 such that there is no free space between the second namespace NS2 and the fourth namespace NS4.

In the example shown in FIG. 6, the storage device 100 receives a request (e.g., a command) to create a new third namespace NS3 having a size of 20 from the host 200, after the third and fifth namespaces NS3 and NS5 have been deleted. For example, the host 200 may send a command to the storage device 100 requesting creation of a namespace. Further, the command may identify the size of the namespace to create or the storage device 100 may determine the size based on a pre-defined parameter stored within the storage device 100. The namespace manager 111a may dynamically create the new third namespace NS3 in a logical address space 63, in response to the received creation request. Specifically, the namespace manager 111a may allocate a logical address space from LBA50 to LBA69 to the new third namespace NS3 such that the fourth namespace NS4 and the third namespace NS3 have logical address spaces contiguous to each other in the logical address space 63. Thus, there is no free space between the previously created fourth namespace NS4 and the newly created third namespace NS3.

Figure 7:
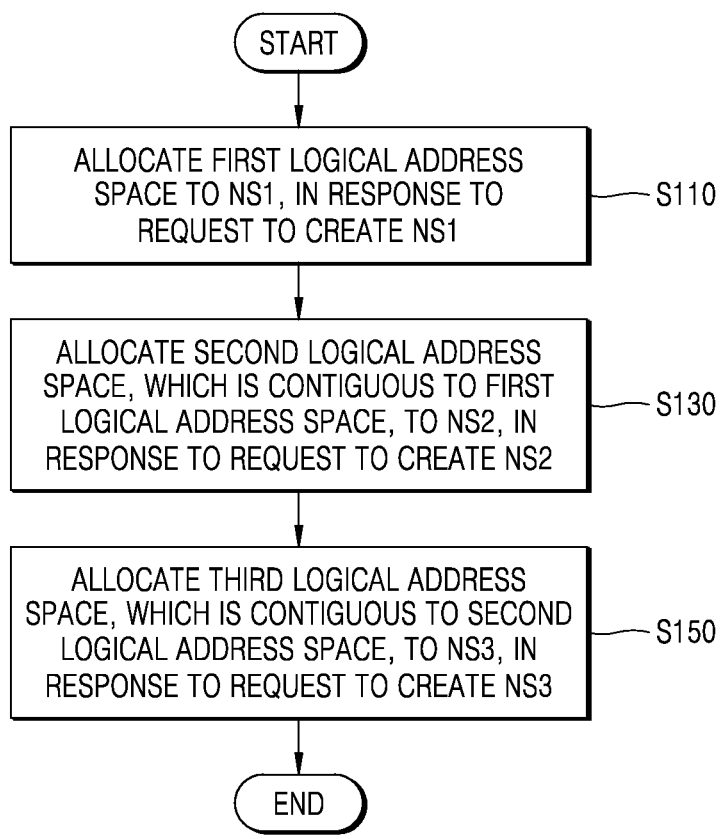
FIG. 7 is a flowchart illustrating a method of operating a storage device, according to an exemplary embodiment of the inventive concept.
Figure 8:
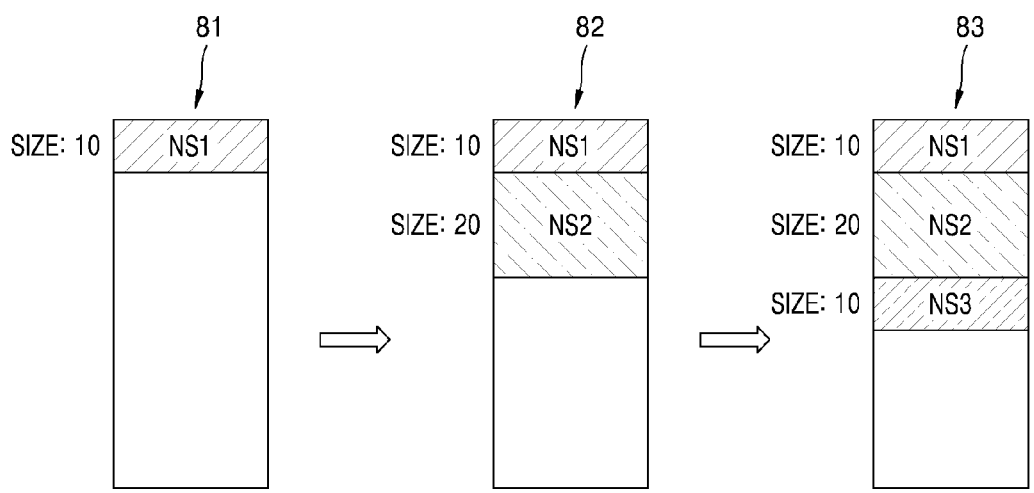
FIG. 8 illustrates a namespace creation operation according to the method of FIG. 7.

FIG. 7 is a flowchart illustrating a method of operating a storage device, according to an exemplary embodiment of the inventive concept. FIG. 8 illustrates a namespace creation operation according to the method of FIG. 7. Hereinafter, the method of operating a storage device will be described with reference to FIGS. 1, 7, and 8.

Referring to FIGS. 7 and 8, the method of operating a storage device, according to this embodiment, is an operation of dynamically creating a namespace in the storage device, and may include, for example, time-series operations performed in the storage device 100. The descriptions made with reference to FIGS. 1 to 6 may also be applied to this embodiment, and repeated descriptions thereof will be omitted.

In operation S110, a first logical address space is allocated to a first namespace NS1, in response to a request to create the first namespace NS1. For example, the first namespace NS1 may have a size of 10, and the first logical address space from LBA0 to LBA9 in a logical address space 81 may be allocated to the first namespace NS1.

In operation S130, a second logical address space contiguous to the first logical address space is allocated to a second namespace NS2, in response to a request to create the second namespace NS2. For example, the second namespace NS2 may have a size of 20, and the second logical address space from LBA10 to LBA29 in a logical address space 82 may be allocated to the second namespace NS2.

In operation S150, a third logical address space contiguous to the second logical address space is allocated to a third namespace NS3, in response to a request to create the third namespace NS3. For example, the third namespace NS3 may have a size of 10, and the third logical address space from LBA30 to LBA49 in a logical address space 83 may be allocated to the third namespace NS3.

Figure 9:
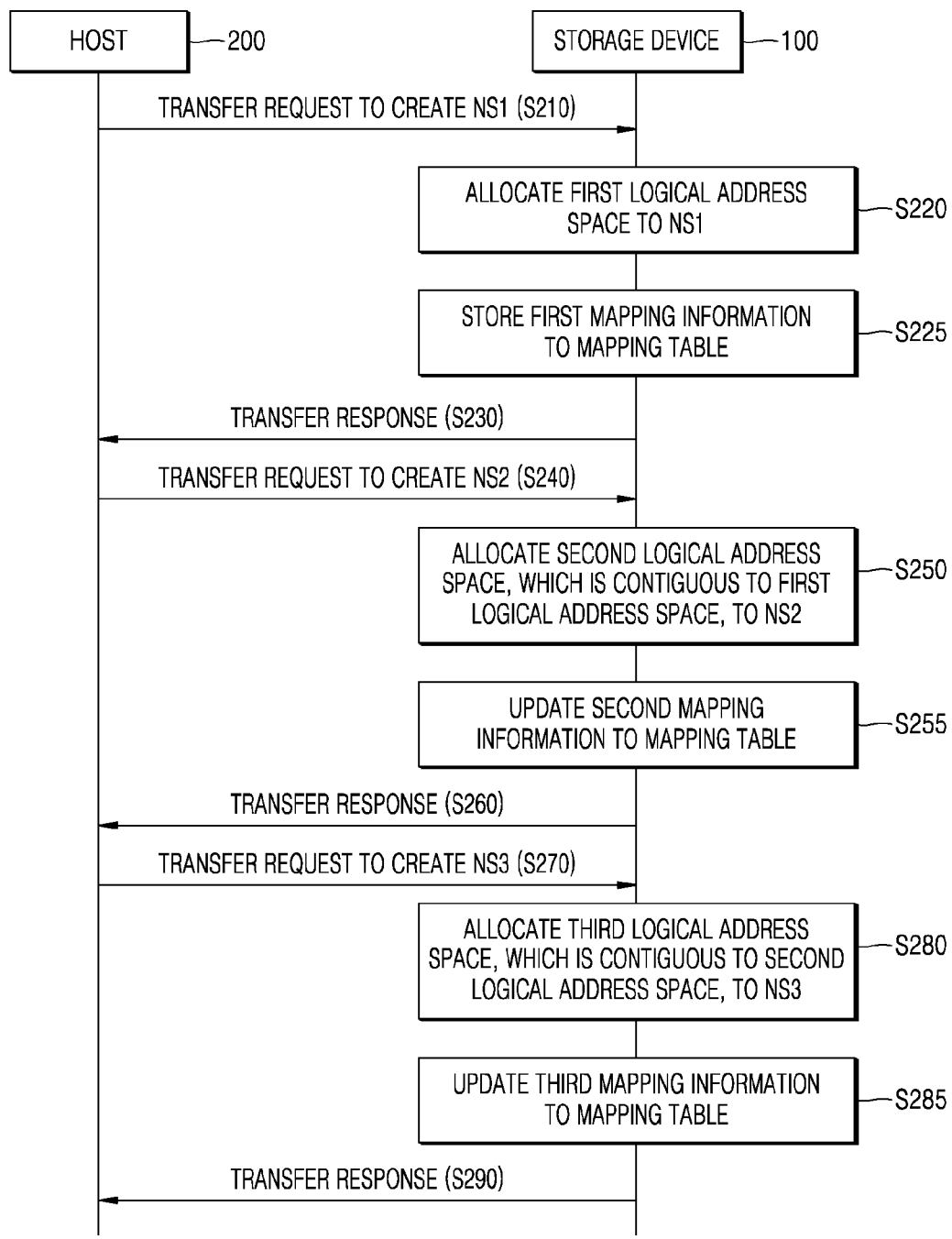
FIG. 9 is a flowchart illustrating operations between a host and a storage device, according to an exemplary embodiment of the inventive concept.
Figure 10:
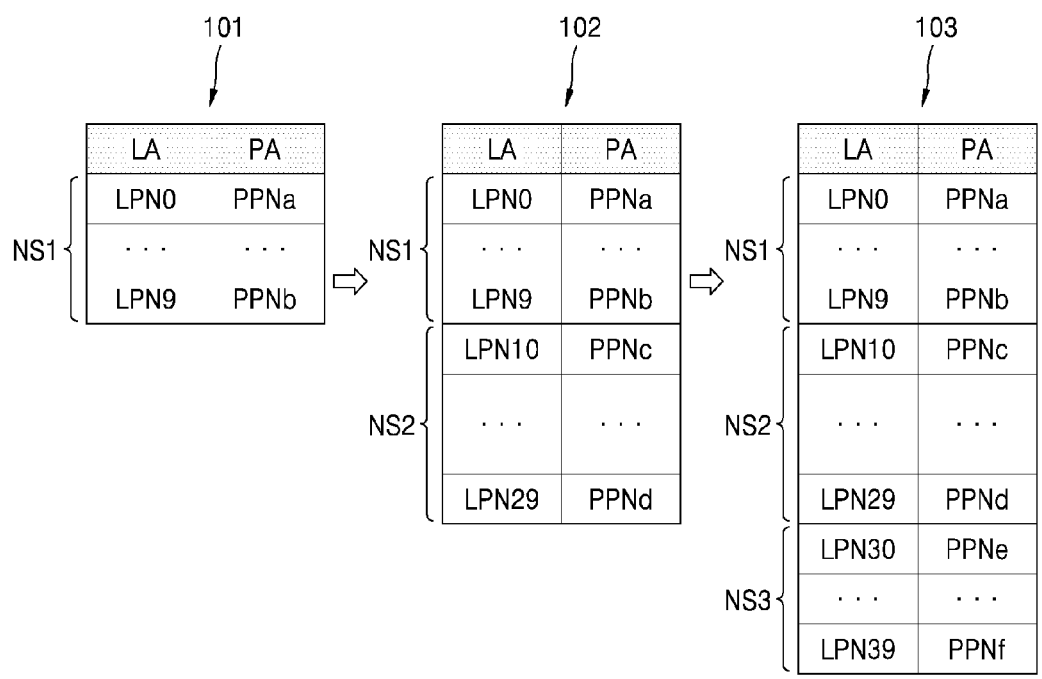
FIG. 10 illustrates modifying a mapping table, according to a creation operation of a namespace, which is illustrated in FIG. 9.

FIG. 9 is a flowchart illustrating operations between the host 200 and the storage device 100, according to an exemplary embodiment of the inventive concept. FIG. 10 illustrates modifying a mapping table, according to a namespace creation operation illustrated in FIG. 9. Hereinafter, a method of creating a namespace will be described in detail with reference to FIGS. 9 and 10.

Referring to FIGS. 9 and 10, in operation S210, the host 200 transfers a request (e.g., a command) to create a first namespace NS1 to the storage device 100. In operation S220, the storage device 100 allocates a first logical address space to the first namespace NS1, in response to the request to create the first namespace NS1.

In operation S225, the storage device 100 stores first mapping information including mapping between the first logical address space and a first physical address space corresponding to the first logical address space to a mapping table. For example, in a mapping table 101, the first logical address space may include logical addresses from Logical Page Number 0 (LPN0) to LPN9, a physical address corresponding to LPN0 may be Physical Page Number a (PPNa), and a physical address corresponding to LPN9 may be PPNb.

In operation S230, the storage device 100 transfers a response message indicating the completion of the creation of the first namespace NS1 to the host 200. In an embodiment, if the storage device 100 is unable to create the first namespace NS1, the storage device 100 does not send out the response message. In this embodiment, if the host 200 does not receive the response message within a certain amount of time from when it transferred the request to create the first namespace NS1, the host 200 can re-send the request to the storage device 100. In an embodiment, the response message indicates whether the creation of the namespace was successful or not. The output of the response message indicating completion of the creation of the first namespace NS1 is optional.

In operation S240, the host 200 transfers a request to create a second namespace NS2 to the storage device 100. In operation S250, the storage device 100 allocates a second logical address space contiguous to the first logical address space to the second namespace NS2, in response to the request to create the second namespace NS2.

In operation S255, the storage device 100 updates second mapping information including a mapping between the second logical address space and a second physical address space corresponding to the second logical address space to the mapping table. For example, in an updated mapping table 102, the second logical address space may include logical addresses from LPN10 to LPN29, a physical address corresponding to LPN10 may be PPNc, and a physical address corresponding to LPN29 may be PPNd.

In operation S260, the storage device 100 transfers a response message indicating the completion of the creation of the second namespace NS2 to the host 200. The output of the response message indicating completion of the creation of the second namespace NS2 is optional.

In operation S270, the host 200 transfers a request to create a third namespace NS3 to the storage device 100. In operation S280, the storage device 100 allocates a third logical address space contiguous to the second logical address space to the third namespace NS3, in response to the request to create the third namespace NS3.

In operation S285, the storage device 100 updates third mapping information including a mapping between the third logical address space and a third physical address space to the mapping table. For example, in an updated mapping table 103, the third logical address space may include logical addresses from LPN30 to LPN39, a physical address corresponding to LPN30 may be PPNe, and a physical address corresponding to LPN39 may be PPNf.

In operation S290, the storage device 100 transfers a response message indicating the completion of the creation of the third namespace NS3 to the host 200. The output of the response message indicating completion of the creation of the third namespace NS3 is optional.

Figure 11:
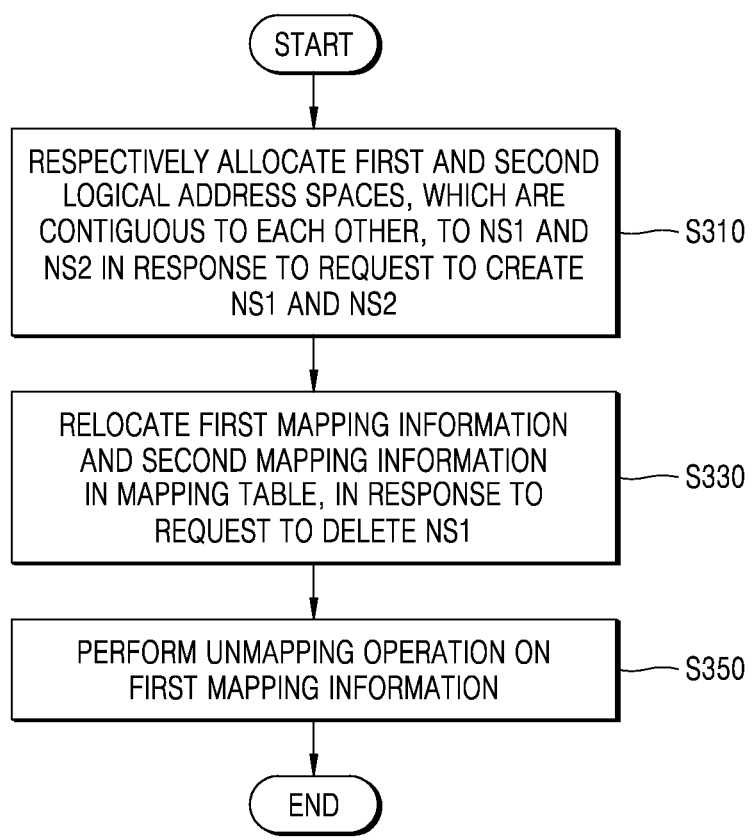
FIG. 11 is a flowchart illustrating a method of operating a storage device, according to an exemplary embodiment of the inventive concept.
Figure 12:
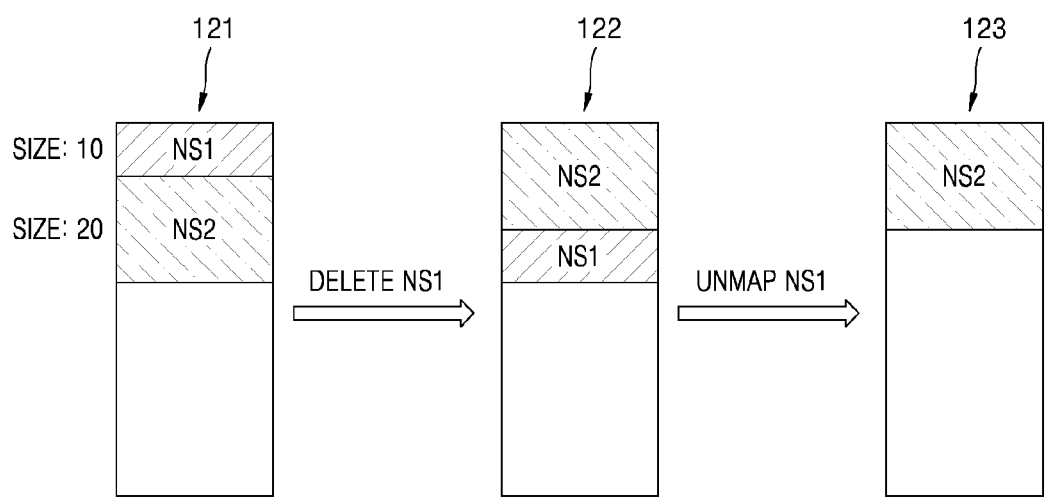
FIG. 12 illustrates a namespace deletion operation according to the method of FIG. 11.

FIG. 11 is a flowchart illustrating a method of operating a storage device, according to an exemplary embodiment of the inventive concept. FIG. 12 illustrates a namespace deletion operation according to the method of FIG. 11. Hereinafter, the method of operating a storage device will be described in detail with reference to FIGS. 1, 11, and 12.

Referring to FIGS. 11 and 12, the method of operating a storage device, according to this embodiment, may include, for example, time-series operations performed in the storage device 100, as operations of dynamically creating and deleting a namespace in the storage device. The descriptions made with reference to FIGS. 1 to 6 may also be applied to this embodiment, and repeated descriptions thereof will be omitted.

In operation S310, first and second logical address spaces contiguous to each other are respectively allocated to first and second namespaces NS1 and NS2, in response to a request to create the first and second namespaces NS1 and NS2. For example, the first namespace NS1 may have a size of 10, and a first logical address space from LBA0 to LBA9 in a logical address space 121 may be allocated to the first namespace NS1. For example, the second namespace NS2 may have a size of 20, and a second logical address space from LBA10 to LBA29 in the logical address space 121 may be allocated to the second namespace NS2.

In this embodiment, the logical address space 121 may be mapped to a physical address space in a 1:1 manner, and may be equal to or less than storage capacity of the storage device 100. In an embodiment, the operations of creating the first and second namespaces NS1 and NS2 are substantially simultaneously performed. In an embodiment, the operations of creating the first and second namespaces NS1 and NS2 are sequentially performed.

In operation S330, first mapping information regarding the first namespace NS1 and second mapping information regarding the second namespace NS2 in a mapping table are relocated, in response to a request to delete the first namespace NS1. For example, in a logical address space 122, locations of the first mapping information and the second mapping information are changed, whereby the second mapping information may be relocated to a logical address space from LBA0 to LBA19, and the first mapping information may be relocated to a logical address space from LBA20 to LBA29. However, the inventive concept is not limited thereto. According to at least one embodiment, after the receipt of the request to delete the first namespace NS1, a contiguous logical address space in the logical address space 122 is determined, and when the contiguous logical address space is insufficient, the relocation of the first mapping information and the second mapping information is performed.

In operation S350, an unmapping operation is performed on the first mapping information of the first namespace NS1. Thus, only the second mapping information of the second namespace NS2 remains in a logical address space 123, and data stored in a physical address according to the first mapping information may be invalidated. Therefore, the number of free blocks in the non-volatile memory 120 may be increased, and thus, garbage collection may be efficiently performed. For example, the unmapping operation may be performed as a background operation. In an embodiment, after operation S350, an operation of updating block information may be further performed, as described below with reference to FIGS. 26 to 28.

Figure 13:
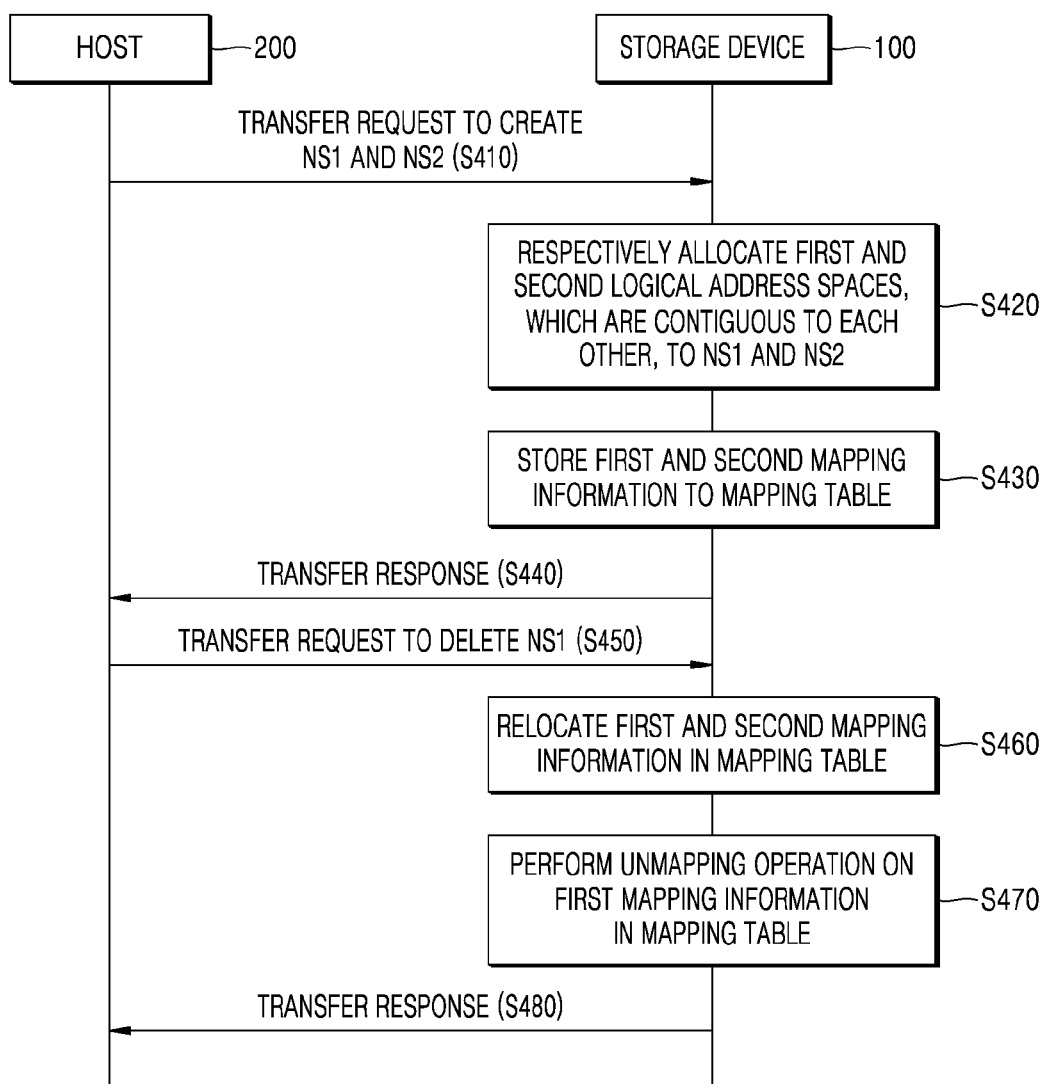
FIG. 13 is a flowchart illustrating operations between a host and a storage device, according to an exemplary embodiment of the inventive concept.
Figure 14:
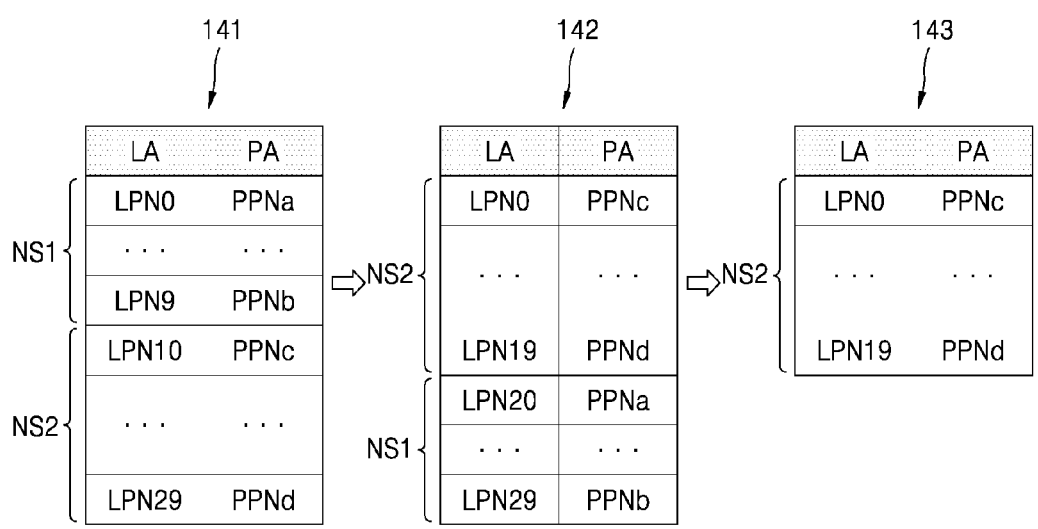
FIG. 14 illustrates modifying a mapping table, according to a namespace deletion operation illustrated in FIG. 13.

FIG. 13 is a flowchart illustrating operations between the host 200 and the storage device 100, according to an exemplary embodiment of the inventive concept. FIG. 14 illustrates modifying a mapping table, according to a namespace deletion operation illustrated in FIG. 13. Hereinafter, a method of deleting a namespace will be described in detail with reference to FIGS. 13 and 14.

Referring to FIGS. 13 and 14, in operation S410, the host 200 transfers a request to create first and second namespaces NS1 and NS2 to the storage device 100. In operation S420, the storage device 100 respectively allocates first and second logical address spaces contiguous to each other to the first and second namespaces NS1 and NS2, in response to the request to create the first and second namespaces NS1 and NS2.

In operation S430, the storage device 100 stores first mapping information including a mapping between the first logical address space and a first physical address space and second mapping information including a mapping between the second logical address space and a second physical address space to a mapping table. For example, in a mapping table 141, the first logical address space may include logical addresses from LPN0 to LPN9, and the second logical address space may include logical addresses from LPN10 to LPN29. In operation S440, the storage device 100 transfers a response message indicating the completion of the creation of the first and second namespaces NS1 and NS2 to the host 200. The transfer of the response message is optional.

In operation S450, the host 200 transfers a request to delete the first namespace NS1 to the storage device 100. In operation S460, the storage device 100 relocates the first mapping information and the second mapping information in the mapping table. For example, in a mapping table 142, if the first mapping information including a mapping between the first logical address space and the first physical address space, which has been used by the first namespace NS1 is deleted, and the first physical address space remains as it is, a logical address space in the storage device 100 may be fragmented.

According to this embodiment, in the mapping table 142, valid address spaces may be collected by allocating the first logical address space to the second namespace NS2. Specifically, LPN0 to LPN9, which have been included in the first logical address space, and LPN10 to LPN19, which have been included in the second logical address space, may be allocated to the second namespace NS2. Thus, the mapping table 142 may be updated such that PPNc, which has corresponded to LPN10, corresponds to LPN0 and PPNd, which has corresponded to LPN29, corresponds to LPN19. In addition, LPN20 to LPN29, which have been included in the second logical address space, may be allocated to the first namespace NS1. Therefore, the mapping table 142 may be updated such that PPNa, which has corresponded to LPN0, corresponds to LPN20 and PPNb, which has corresponded to LPN9, corresponds to LPN29. However, the inventive concept is not limited thereto. According to at least one embodiment, after operation S450, a contiguous logical address space in a logical address space is determined, and when the contiguous logical address space is insufficient, operation S460 is performed.

In operation S470, the storage device 100 performs an unmapping operation on the first mapping information of the first namespace NS1, in the mapping table. For example, in a mapping table 143, pieces of mapping information ranging from mapping information between LPN20 and PPNa to mapping information between LPN29 and PPNb are unmapped. Next, block information corresponding to PPNa to PPNb may be modified. In an exemplary embodiment, in the block information, the number of valid pages for PPNa to PPNb is modified according to the unmapping operation. Thus, data stored in PPNa to PPNb may be invalidated, and garbage collection may be efficiently performed by increasing the number of free blocks in the non-volatile memory 120. In operation S480, the storage device 100 transfers a response message indicating the completion of the deletion of the first namespace NS1 to the host 200. The transfer of the response message is optional.

Figure 15:
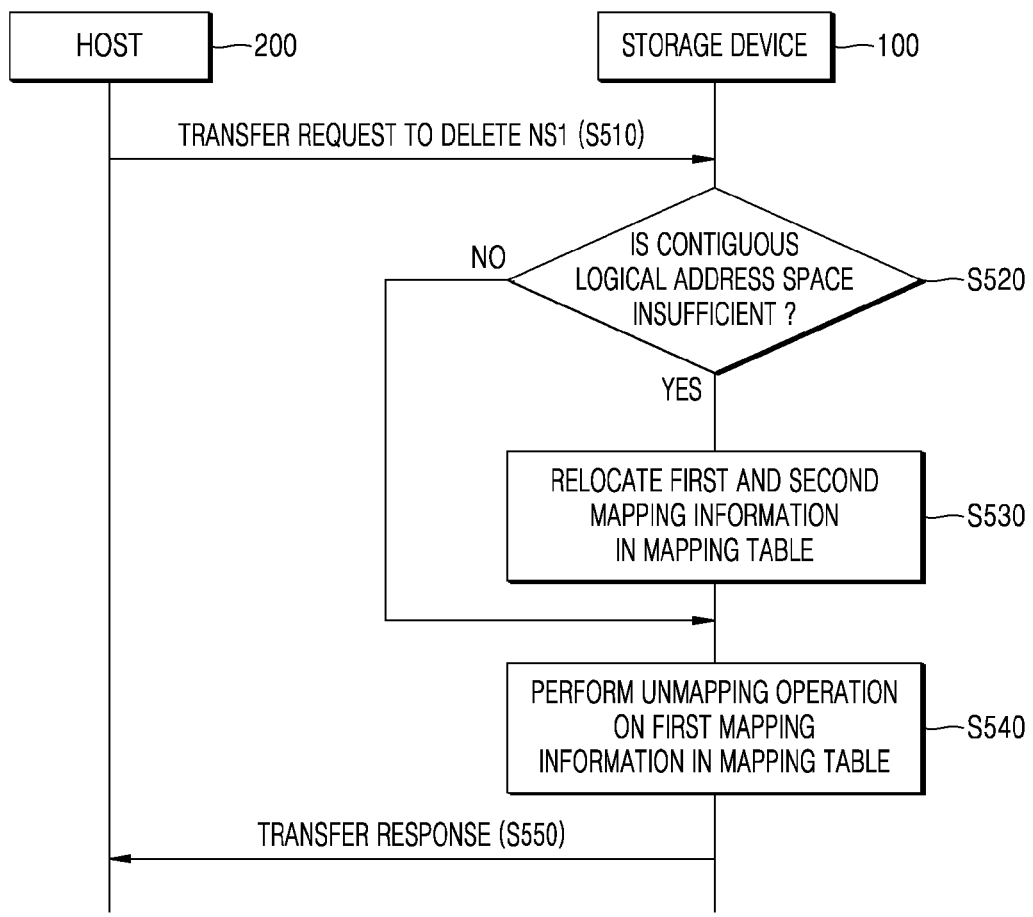
FIG. 15 is a flowchart illustrating operations between a host and a storage device, according to an exemplary embodiment of the inventive concept.

FIG. 15 is a flowchart illustrating operations between the host 200 and the storage device 100, according to an exemplary embodiment of the inventive concept.

Referring to FIG. 15, this embodiment is an example of an operation of deleting a namespace, particularly a specific example of operations S450 to S480 of FIG. 13. In operation S510, the host 200 transfers a request to delete the first namespace NS1 to the storage device 100. In operation S520, the storage device 100 determines whether a contiguous logical address space is insufficient. The contiguous logical address space may be insufficient when deletion of the namespace would result in fragmentation. As a result of the determination, if the contiguous logical address space is insufficient, operation S530 is performed, and if not, operation S540 is performed. In operation S530, the storage device 100 relocates the first mapping information and the second mapping information in the mapping table.

In operation S540, the storage device 100 performs an unmapping operation on the first mapping information in the mapping table. Thus, data stored in a physical address included in the first mapping information may be invalidated, and the number of free blocks in the non-volatile memory 120 may be increased. In operation S550, the storage device 100 transfers a response message indicating the completion of the unmapping operation to the host 200. The transfer of the response message is optional.

Figure 16:
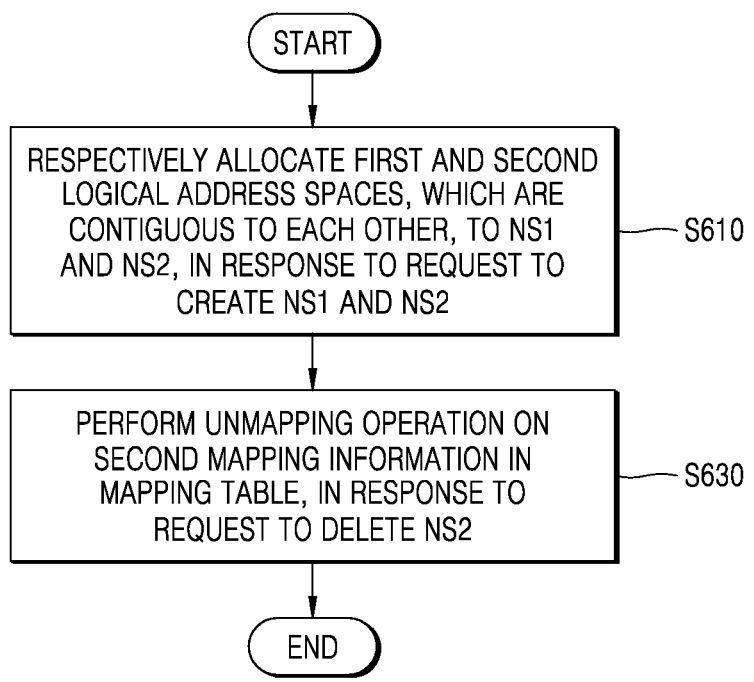
FIG. 16 is a flowchart illustrating a method of operating a storage device, according to an exemplary embodiment of the inventive concept.
Figure 17:
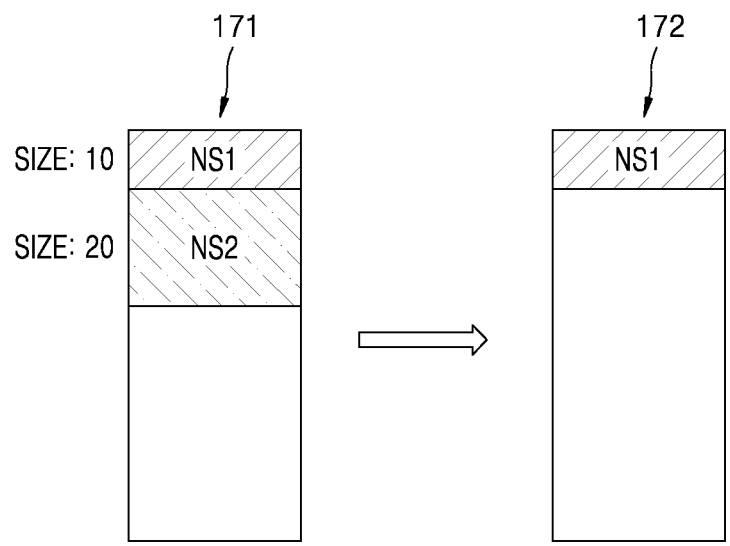
FIG. 17 illustrates modifying a mapping table, according to a namespace deletion operation illustrated in FIG. 16.
Figure 18:
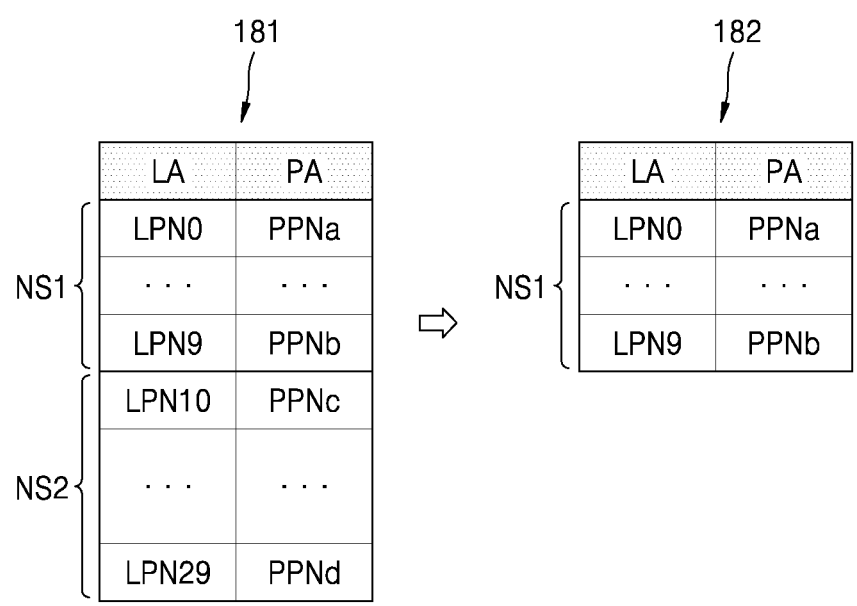
FIG. 18 illustrates modifying a mapping table, according to a namespace deletion operation illustrated in FIG. 16.

FIG. 16 is a flowchart illustrating a method of operating a storage device, according to an exemplary embodiment of the inventive concept. FIG. 17 illustrates modifying a mapping table, according to a namespace deletion operation illustrated in FIG. 16. FIG. 18 illustrates modifying a mapping table, according to a namespace deletion operation illustrated in FIG. 16. Hereinafter, a method of deleting a namespace will be described in detail with reference to FIGS. 16 to 18.

Referring to FIGS. 16 to 18, the method of operating a storage device, according to this embodiment, may correspond to a modification of the method illustrated in FIG. 11, as operations of dynamically creating and deleting a namespace in the storage device. The method according to this embodiment may include, for example, time-series operations performed in the storage device 100 of FIG. 1. The descriptions made with reference to FIGS. 1 to 6 may also be applied to this embodiment, and repeated descriptions thereof will be omitted.

In operation S610, first and second logical address spaces contiguous to each other are respectively allocated to first and second namespaces NS1 and NS2, in response to a request to create the first and second namespaces NS1 and NS2. For example, in a logical address space 171, the first logical address space may be allocated to the first namespace NS1 having a size of 10, and the second logical address space may be allocated to the second namespace NS2 having a size of 20.

In this embodiment, the logical address space 171 may be mapped to a physical address space in a 1:1 manner, and may be equal to or less than storage capacity of the storage device 100. For example, in a mapping table 181, the first logical address space may include logical addresses from LNP0 to LPN9, and the second logical address space may include logical addresses from LNP10 to LPN29.

In operation S630, an unmapping operation is performed on second mapping information in the mapping table, in response to a request to delete the second namespace NS2. Thus, only first mapping information of the first namespace NS1 remains in a logical address space 172, and only pieces of mapping information ranging from mapping information between LPN0 and PPNa to mapping information between LPN9 and PPNb remain in a mapping table 182. Therefore, data stored in PPNc to PPNd may be invalidated, and the number of free blocks in the non-volatile memory 120 may be increased. For example, the unmapping operation may be performed as a background operation.

Figure 19:
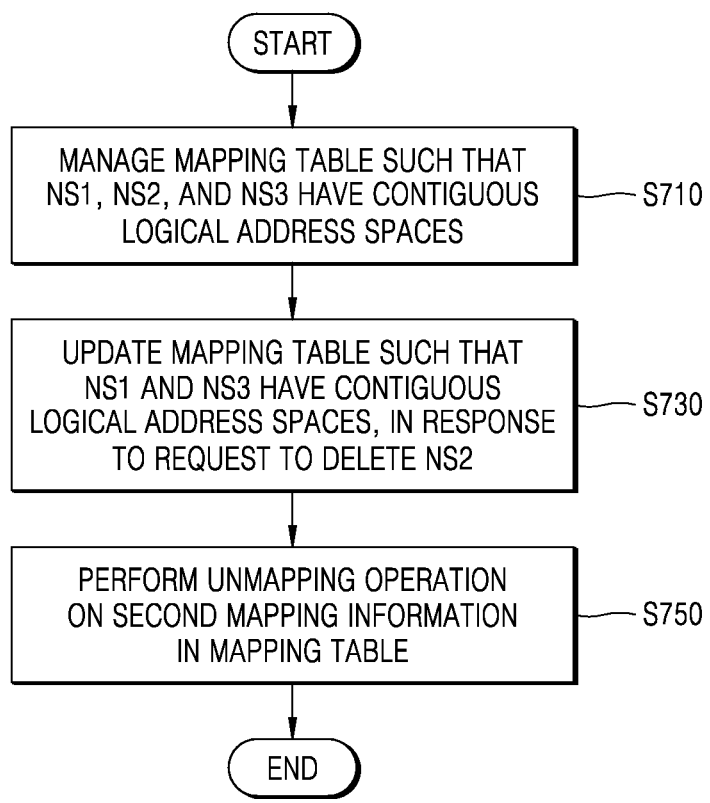
FIG. 19 is a flowchart illustrating a method of operating a storage device, according to an exemplary embodiment of the inventive concept.
Figure 20:
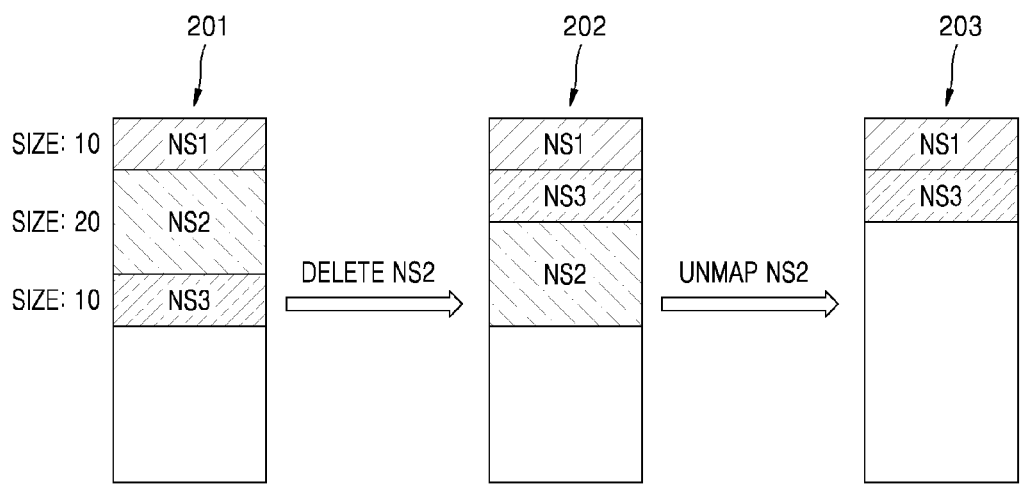
FIG. 20 illustrates a namespace deletion operation of a storage device, according to the method of FIG. 19.
Figure 21:
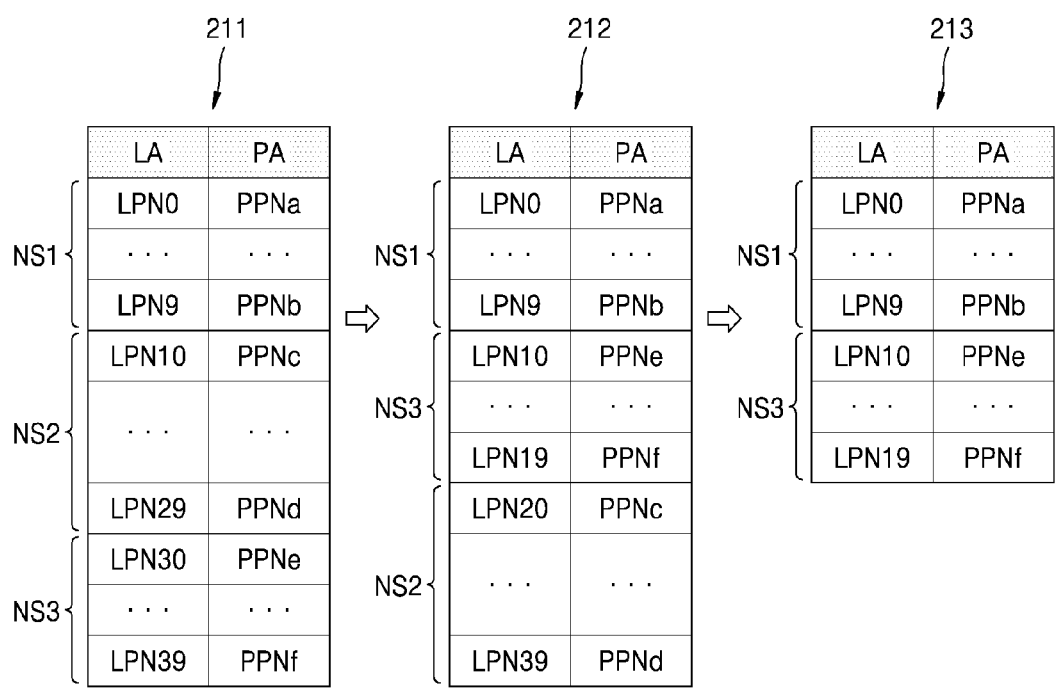
FIG. 21 illustrates modifying a mapping table, according to the method of FIG. 19.

FIG. 19 is a flowchart illustrating a method of operating a storage device, according to an exemplary embodiment of the inventive concept. FIG. 20 illustrates a namespace deletion operation of a storage device, according to the method of FIG. 19. FIG. 21 illustrates modifying a mapping table, according to the method of FIG. 19.

Referring to FIGS. 19 to 21, in operation S710, the storage device 100 manages a mapping table such that first to third namespaces NS1, NS2, and NS3 have contiguous logical address spaces. For example, in a logical address space 201, a first logical address space may be allocated to the first namespace NS1 having a size of 10, a second logical address space contiguous to the first logical address space may be allocated to the second namespace NS2 having a size of 20, and a third logical address space contiguous to the second logical address space may be allocated to the third namespace NS3 having a size of 10.

In this embodiment, the logical address space 201 may be mapped to a physical address space in a 1:1 manner, and may be equal to or less than storage capacity of the storage device 100. For example, in a mapping table 211, the first logical address space may include logical addresses from LNP0 to LPN9, the second logical address space may include logical addresses from LNP10 to LPN29, and the third logical address space may include logical addresses from LNP30 to LPN39.

In operation S730, the storage device 100 updates the mapping table such that the first namespace NS1 and the third namespace NS3 have contiguous logical address spaces, in response to a request to delete the second namespace NS2. Specifically, in a logical address space 202, second mapping information regarding the second namespace NS2 and third mapping information regarding the third namespace NS3 undergo location change. For example, the third mapping information may be relocated to a logical address space from LBA10 to LBA19, and the second mapping information may be relocated to a logical address space from LBA20 to LBA39.

According to this embodiment, in a mapping table 212, valid address spaces may be collected by allocating the second logical address space to the third namespace NS3.

Specifically, LPN10 to LPN19, which have been included in the second logical address space, may be allocated to the third namespace NS3. Thus, the mapping table 212 may be updated such that PPNe, which has corresponded to LPN30, corresponds to LPN10 and PPNf, which has corresponded to LPN39, corresponds to LPN19. In addition, LPN20 to LPN29, which is included in the second logical address space, and LPN30 to LPN39, which have been included in the third logical address space, may be allocated to the second namespace NS2. Thus, the mapping table 212 may be updated such that PPNc, which has corresponded to LPN10, corresponds to LPN20, and PPNd, which has corresponded to LPN29, corresponds to LPN39.

In operation S750, the storage device 100 performs an unmapping operation on the mapping information of the second namespace NS2, in the mapping table. Thus, only the first mapping information of the first namespace NS1 and the third mapping information of the third namespace NS3 remain in a logical address space 203, and data stored in a physical address according to the second mapping information may be invalidated. For example, in a mapping table 213, pieces of mapping information ranging from mapping information between LPN20 and PPNc to mapping information between LPN39 and PPNd are unmapped. Therefore, data stored in PPNc to PPNd may be invalidated, and the number of free blocks in the non-volatile memory 120 may be increased. For example, the unmapping operation may be performed as a background operation.

Figure 22:
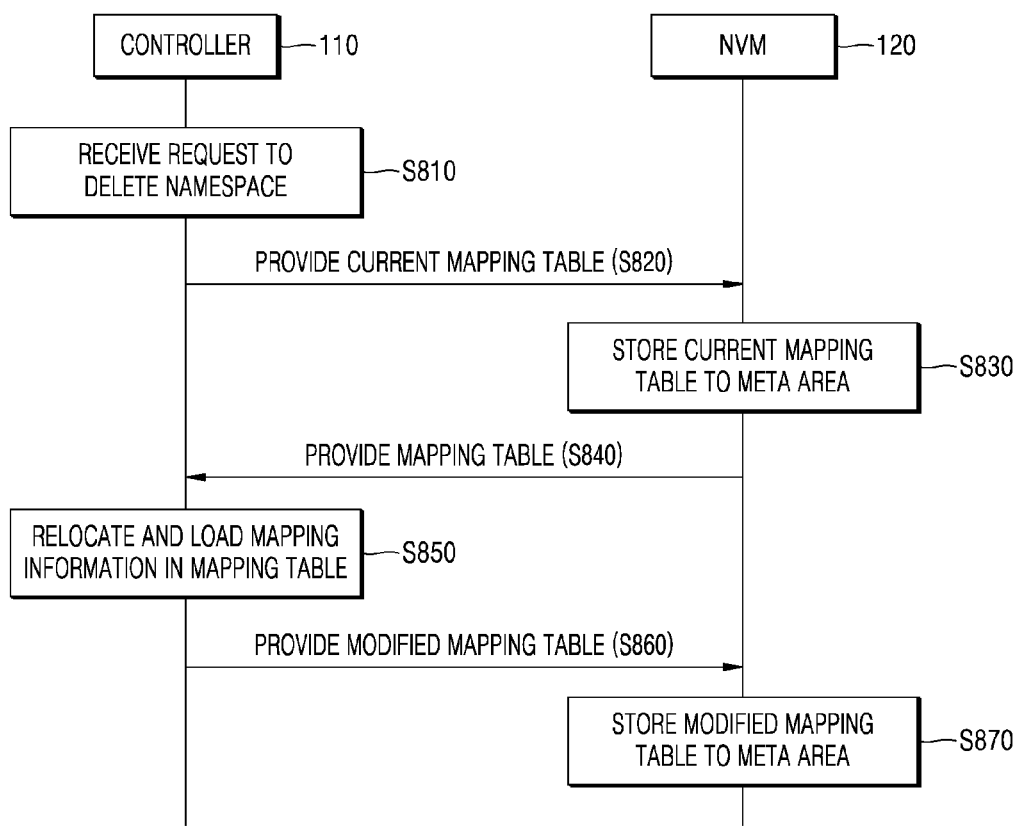
FIG. 22 is a flowchart illustrating operations between a controller and non-volatile memory, when a namespace is deleted, according to an exemplary embodiment of the inventive concept.
Figure 23:
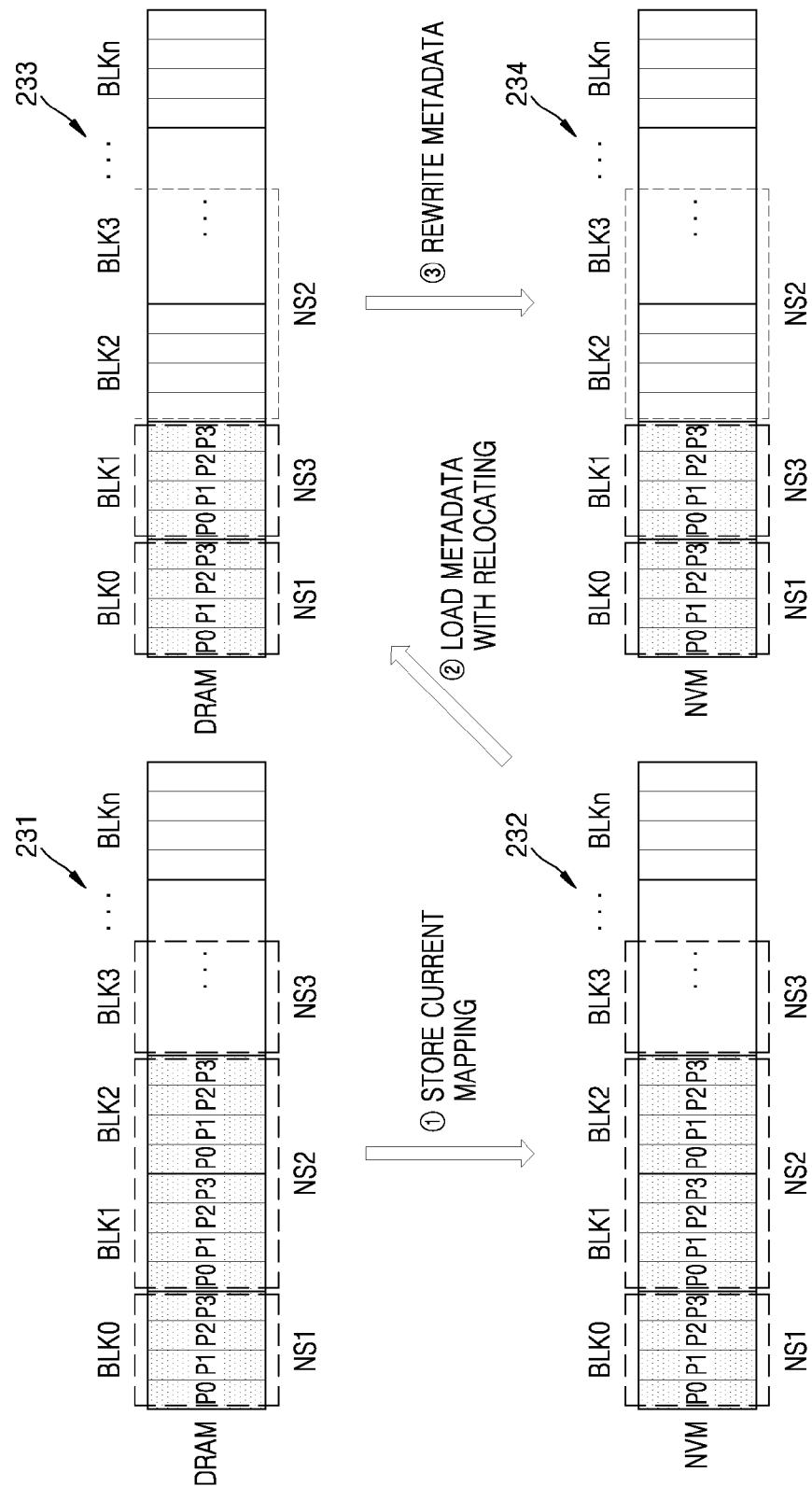
FIG. 23 illustrates a mapping table update operation according to an example of the operations of FIG. 22.

FIG. 22 is a flowchart illustrating operations between the controller 110 and the non-volatile memory 120, when a namespace is deleted, according to an exemplary embodiment of the inventive concept. FIG. 23 illustrates a mapping table update operation according to an example of the operations of FIG. 22.

Referring to FIGS. 22 and 23, in operation S810, the controller 110 receives a request to delete one of a plurality of namespaces. For example, the plurality of namespaces may be first to third namespaces NS1 to NS3, and the controller 110 may receive a request to delete the second namespace NS2.

In operation S820, the controller 110 provides a current mapping table to the non-volatile memory 120. Specifically, the controller 110 may provide the current mapping table, which is loaded into volatile memory (for example, the memory 111 of FIG. 4 or the memory 111' of FIG. 5) included in the controller 110, to the meta area 120b of the non-volatile memory 120. In operation S830, the non-volatile memory 120 stores the current mapping table to the meta area 120b.

For example, a current mapping table 231 loaded into DRAM may include mapping information of the first to third namespaces NS1 to NS3. Metadata of the first namespace NS1 may be stored in first to fourth pages P0 to P3 of a first block BLK0, metadata of the second namespace NS2 may be stored in first to fourth pages P0 to P3 of a second block BLK1 and first to fourth pages P0 to P3 of a third block BLK2, and metadata of the third namespace NS3 may be stored in a fourth block BLK3.

In this embodiment, the current mapping table 231 loaded into the DRAM is provided to the non-volatile memory 120, whereby the non-volatile memory 120 stores a mapping table 232 that is the same as the current mapping table 231. Thus, the mapping table 232 stored in the non-volatile memory 120 also includes the mapping information of the first to third namespaces NS1 to NS3. As such, upon execution of the namespace deletion operation, first data input/output between the controller 110 and the non-volatile memory 120 occurs. However, the inventive concept is not limited thereto, and operations S820 and S830 may be omitted. Specifically, if a mapping table already stored in the non-volatile memory 120 is the same as the current mapping table 231 loaded into the DRAM, operations S820 and 830 may be omitted.

In operation S840, the non-volatile memory 120 provides the stored mapping table to the controller 110. In operation S850, the controller 110 relocates and loads mapping information in the mapping table provided by the non-volatile memory 120. Specifically, the controller 110 may load a modified mapping table, in which the mapping information is relocated, into the memory included in the controller 110. However, the inventive concept is not limited thereto, and the controller 110 may load the modified mapping table, in which the mapping information is relocated, into a memory external to the controller 110.

In this embodiment, when the mapping information is read from the non-volatile memory 120 to the DRAM, the mapping information of the third namespace NS3 and the mapping information of the second namespace NS2 may undergo location change, and thus, a modified mapping table 233 may be loaded into the DRAM.

As such, upon execution of the namespace deletion operation, second data input/output between the controller 110 and the non-volatile memory 120 occurs.

According to this embodiment, in the modified mapping table 233, the first namespace NS1 and the third namespace NS3 have logical address spaces contiguous to each other. Thus, even though the second namespace NS2 is deleted, fragmentation between logical address spaces does not occur, and valid logical address spaces may be collected.

In operation S860, the controller 110 provides the modified mapping table to the non-volatile memory 120. In operation S870, the non-volatile memory 120 stores the modified mapping table in the meta area 120b. In this embodiment, the modified mapping table 233 is provided to the non-volatile memory 120, whereby the non-volatile memory 120 stores a mapping table 234 that is the same as the modified mapping table 233. As such, upon execution of the namespace deletion operation, third data input/output between the controller 110 and the non-volatile memory 120 occurs.

Figure 24:
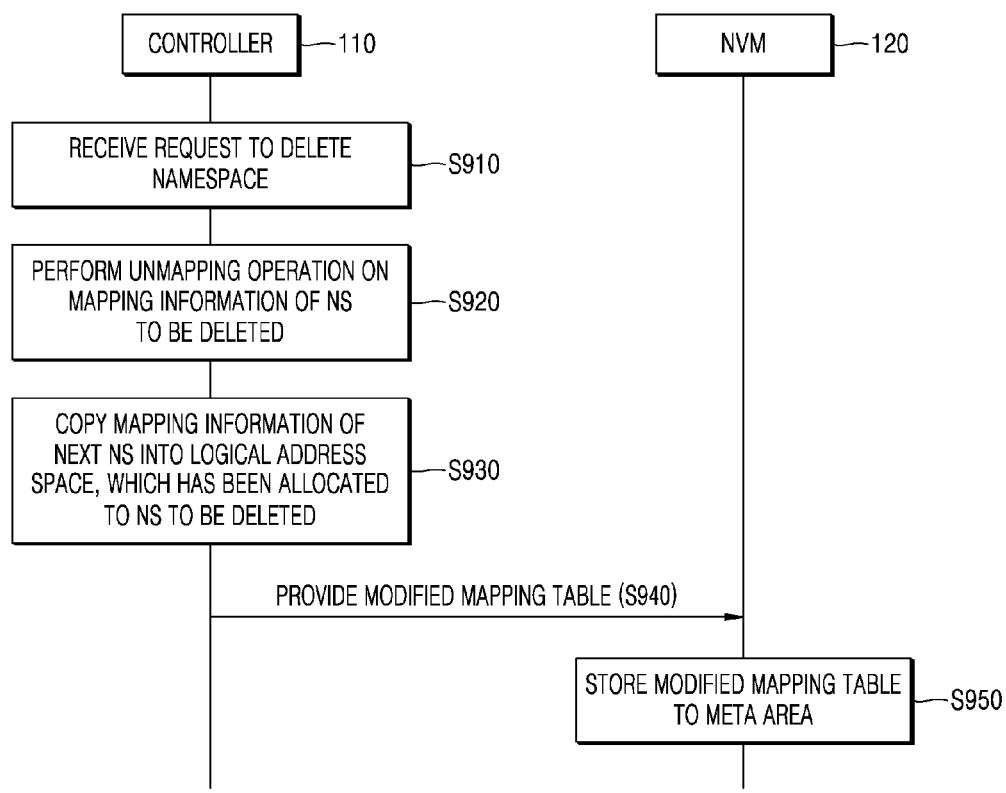
FIG. 24 is a flowchart illustrating operations between a controller and non-volatile memory, when a namespace is deleted, according to an exemplary embodiment of the inventive concept.
Figure 25:
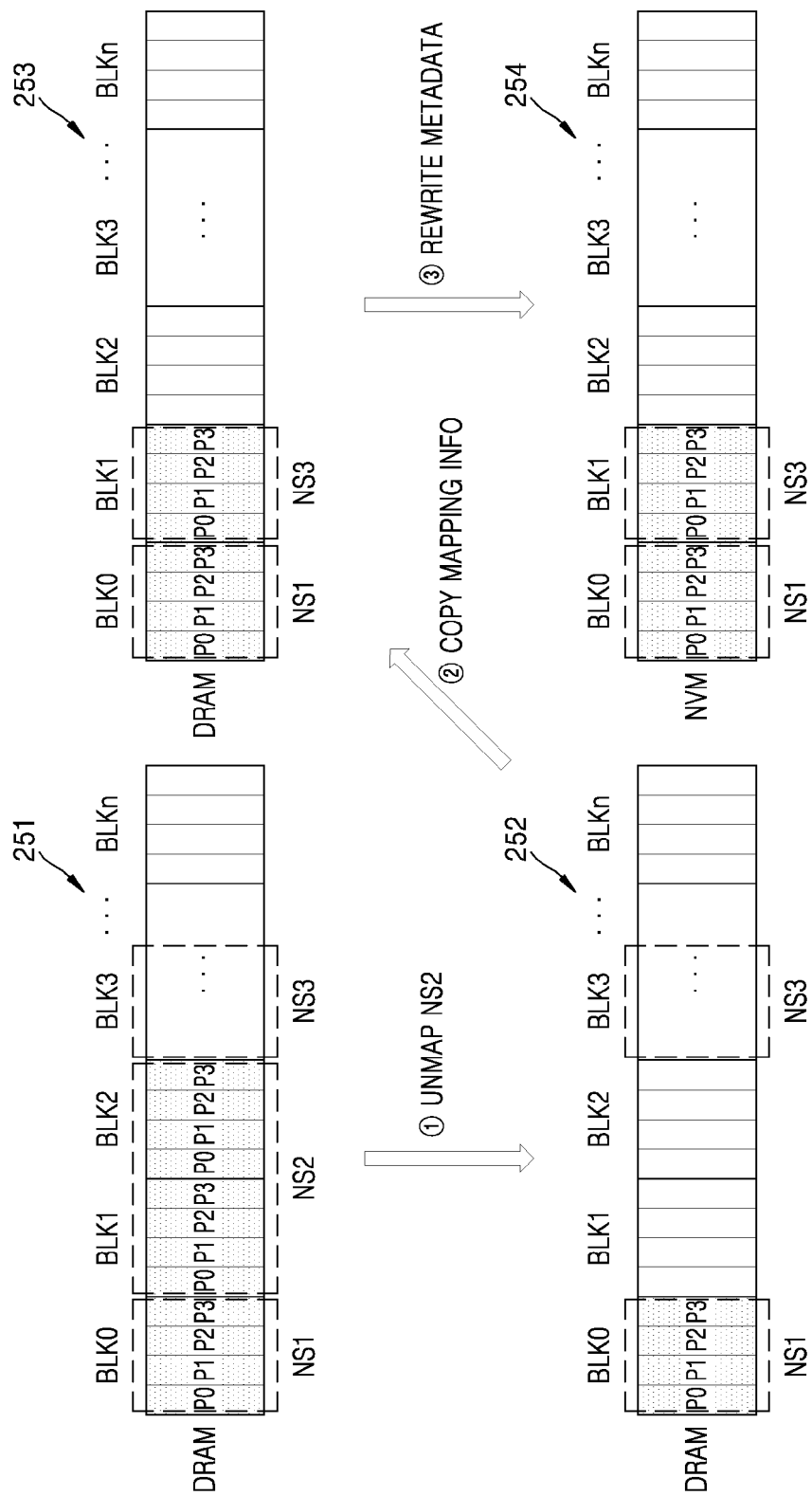
FIG. 25 illustrates a mapping table update operation according to an example of the operations of FIG. 24.

FIG. 24 is a flowchart illustrating operations between the controller 110 and the non-volatile memory 120, when a namespace is deleted, according to an exemplary embodiment of the inventive concept. FIG. 25 illustrates a mapping table update operation according to an example of the operations of FIG. 24.

Referring to FIGS. 24 and 25, in operation S910, the controller 110 receives a request to delete one of a plurality of namespaces. For example, the plurality of namespaces may be first to third namespaces NS1 to NS3, and the controller 110 may receive a request to delete the second namespace NS2. In operation S920, the controller 110 performs an unmapping operation on mapping information of a namespace to be deleted.

For example, a mapping table 251 loaded into DRAM may include mapping information of the first to third namespaces NS1 to NS3. Metadata of the first namespace NS1 may be stored in first to fourth pages P0 to P3 of a first block BLK0, metadata of the second namespace NS2 may be stored in first to fourth pages P0 to P3 of a second block BLK1 and first to fourth pages P0 to P3 of a third block BLK2, and metadata of the third namespace NS3 may be stored in a fourth block BLK3.

In this embodiment, in a mapping table 252, the metadata of the second namespace NS2 may be deleted by the unmapping operation. Specifically, the metadata of the second namespace NS2, which is stored in the first to fourth pages P0 to P3 of the second block BLK1 and the first to fourth pages P0 to P3 of the third block BLK2, is unmapped. Thus, the number of valid pages of physical addresses, which are stored in the first to fourth pages P0 to P3 of the second block BLK1 and the first to fourth pages P0 to P3 of the third block BLK2, that is, the number of valid pages of physical addresses, in which user data is stored, may be changed.

In operation S930, the controller 110 copies mapping information of the next namespace into the logical address space that has been allocated to the namespace to be deleted. For example, the next namespace may be the third namespace NS3. In this embodiment, the mapping information of the third namespace NS3 is copied into the logical address space of the second namespace NS2, thereby creating a modified mapping table 253 in the DRAM.

For example, when the logical address space, which has been allocated to the second namespace NS2, is LBA100 to LBA199 and the logical address space, which has been allocated to the third namespace NS3, is LBA200 to LBA250, the mapping information of the third namespace NS3, which ranges from LBA200 to LBA250, may be copied into mapping information ranging from LBA100 to LBA150. Thus, the modified mapping table 253 may include the mapping information of the first to third namespaces NS1 to NS3.

In operation S940, the controller 110 provides the modified mapping table to the non-volatile memory 120. In operation S950, the non-volatile memory 120 stores the modified mapping table to the meta area 120b. In this embodiment, the modified mapping table 253 created in the DRAM is provided to the non-volatile memory 120, whereby the non-volatile memory 120 stores a mapping table 254 that is the same as the modified mapping table 253. As such, upon execution of the namespace deletion operation, data input/output between the controller 110 and the non-volatile memory 120 occurs.

Hereinafter, a block information update operation performed upon a namespace deletion operation will be described with reference to FIGS. 1 and 26 to 28. The descriptions made with reference to FIGS. 1 to 25 may be applied to the following embodiments, and repeated descriptions thereof will be omitted.

Figure 26:
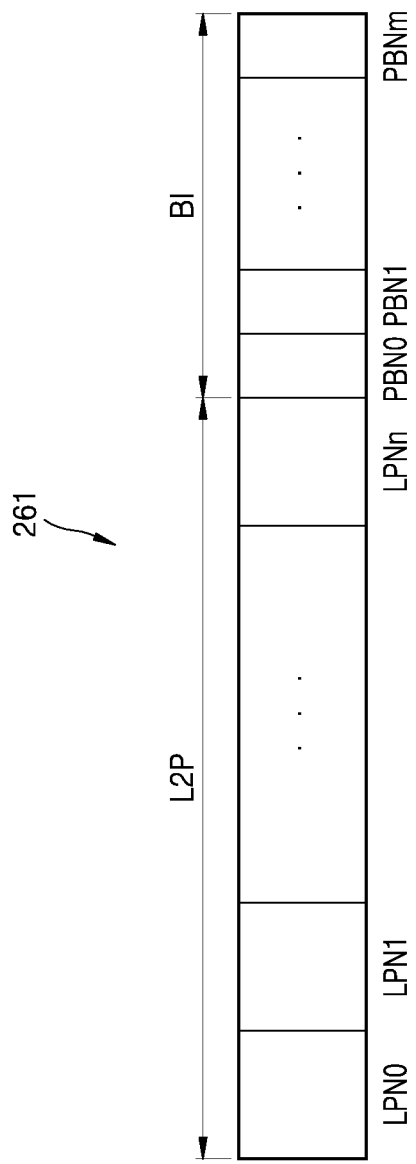
FIG. 26 illustrates an example metadata according to an exemplary embodiment of the inventive concept.

FIG. 26 illustrates an example metadata 261 according to an exemplary embodiment of the inventive concept.

Referring to FIGS. 1 and 26, the metadata 261 includes an L2P mapping table L2P and block information BI. The metadata 261 may be stored in the non-volatile memory 120 of the storage device 100, and may be loaded from the non-volatile memory 120 into volatile memory when power is applied to the storage device 100. Here, the memory may be arranged inside or outside the controller 110 of the storage device 100.

The L2P mapping table L2P may include, for example, mapping information regarding physical address spaces respectively corresponding to LPN0 to LPNn. Here, n may be an arbitrary natural number. In this embodiment, the L2P mapping table L2P may include all pieces of mapping information of a plurality of namespaces created in the storage device 100, and the plurality of namespaces may share the L2P mapping table L2P.

The block information BI may store valid page counts (VPC of FIGS. 27 and 28) for Physical Block Number 0 (PBN0) to PBNm, respectively. Here, n may be an arbitrary natural number. Here, each valid page count refers to the number of valid pages of a plurality of pages included in each block.

The FTL of the controller 110 may perform a garbage collection operation or an erasure operation on the non-volatile memory 120 with reference to the block information BI. For example, if a valid page count for PBN0 is 0, the FTL may consider PBN0 as an invalid block and may perform an erasure operation on PBN0. For example, if a valid page count for PBN1 is equal to or less than a reference value, the FTL may perform garbage collection on PBN1. For example, the garbage collection may include copying the data of multiple blocks having valid page counts equal to or less than the reference value to a free block and performing an erasure operation on the multiple blocks.

Figure 27:
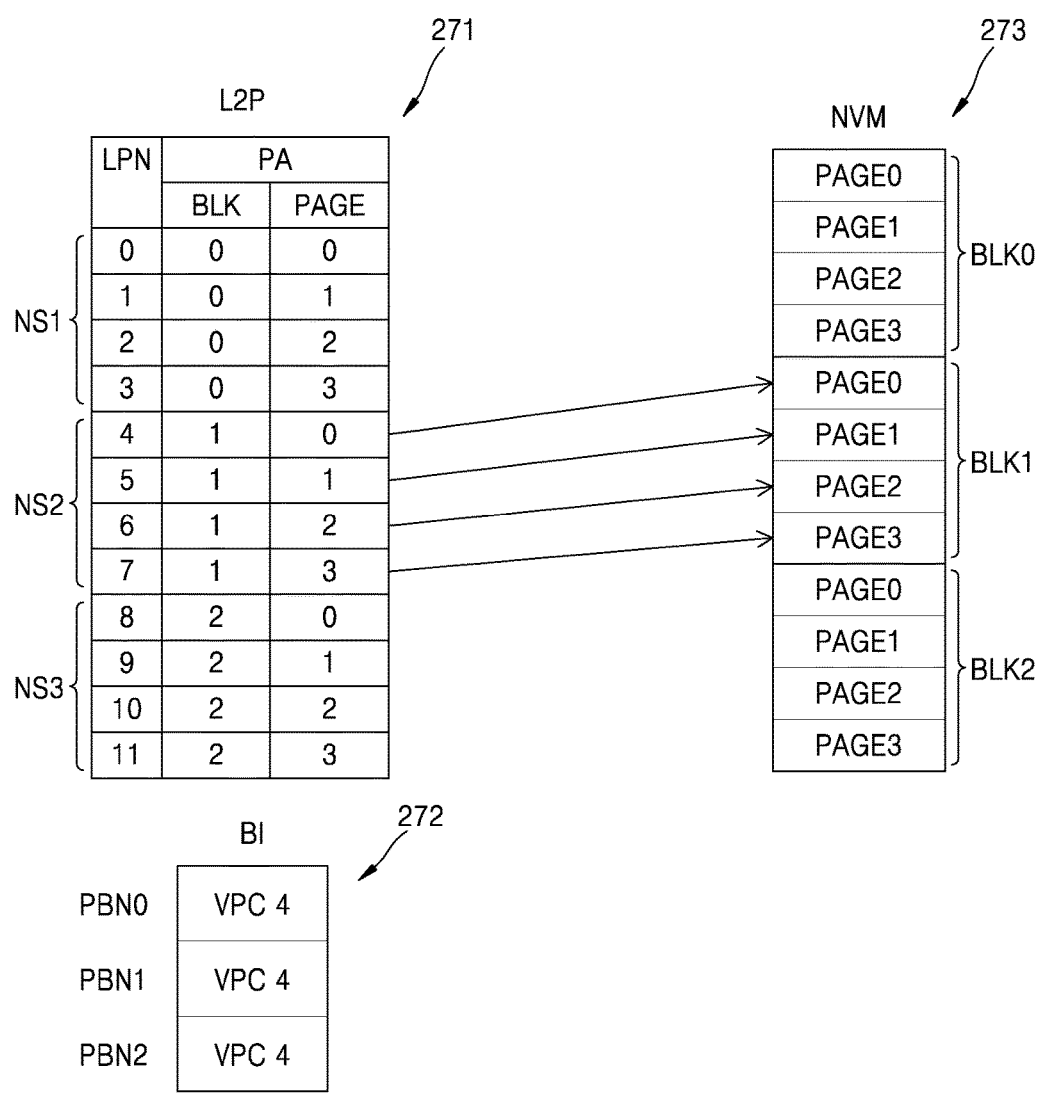
FIG. 27 illustrates an L2P mapping table and block information for managing multiple namespaces, according to an exemplary embodiment of the inventive concept.

FIG. 27 illustrates an L2P mapping table 271 and block information 272 for managing a multi-namespace, according to an exemplary embodiment of the inventive concept.

Referring to FIG. 27, the L2P mapping table 271 includes mapping information of first to third namespaces NS1 to NS3. For example, LPN0 to LPN3 is allocated to the first namespace NS1, LPN4 to LPN7 are allocated to the second namespace NS2, and LPN8 to LPN11 are allocated to the third namespace NS3.

For example, according to the L2P mapping table 271, LPN4 to LPN7 are respectively mapped to first to fourth pages PAGE0 to PAGE3 of a second block BLK1 of non-volatile memory NVM. For example, according to the L2P mapping table 271, since all of first to fourth pages PAGE0 to PAGE3 of a first block BLK0, that is, of PBN0 are valid, a valid page count for PBN0 is 4, in block information 272. In addition, according to the L2P mapping table 271, since all of the first to fourth pages PAGE0 to PAGE3 of the second block BLK1, that is, of PBN1 are also valid, a valid page count for PBN1 is also 4, in the block information 272. A section 273 of the non-volatile memory NVM includes the first block BLK0, the second block BLK1, and the third block BLK2.

Figure 28:
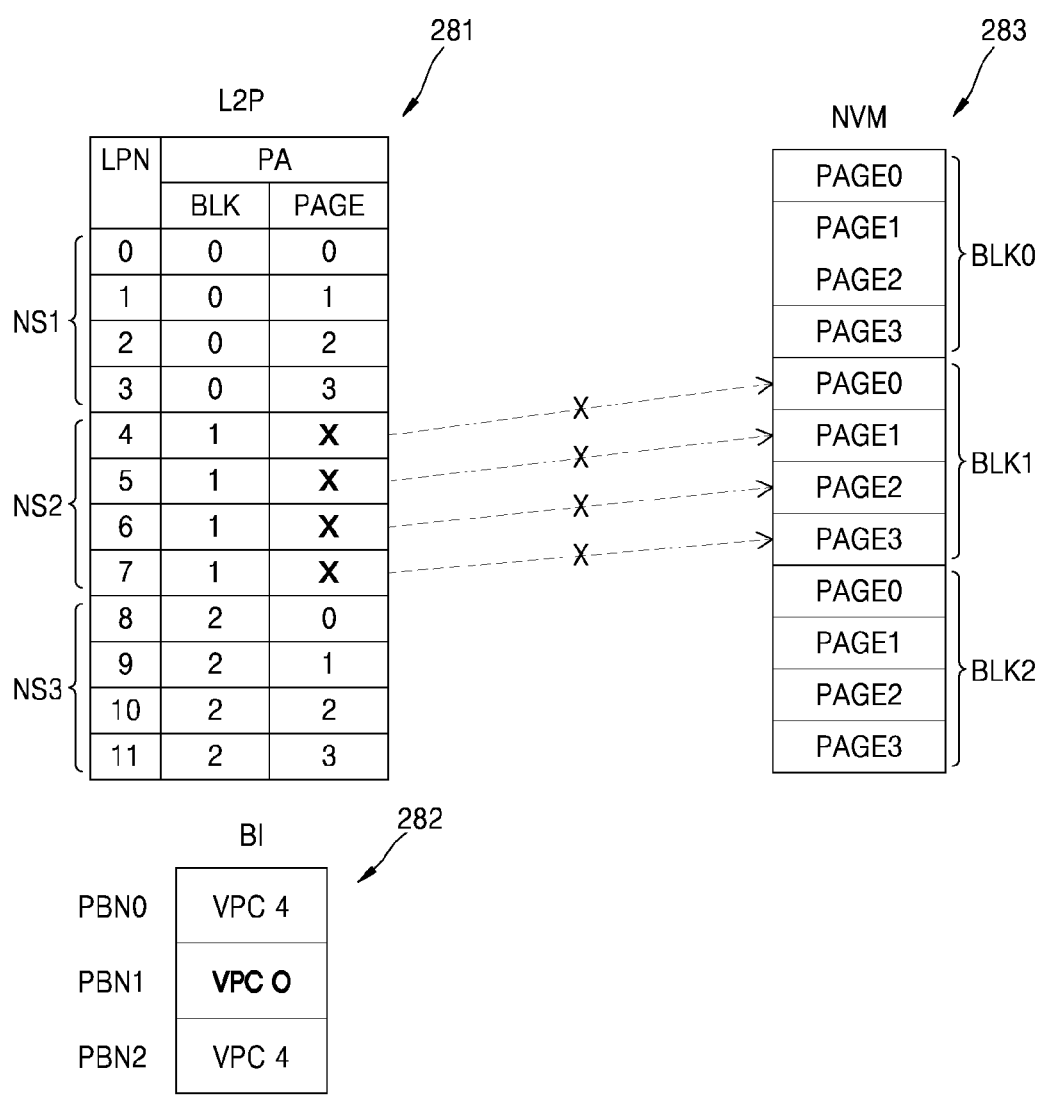
FIG. 28 illustrates an L2P mapping table and block information, which are modified due to a deletion operation of a namespace, according to an exemplary embodiment of the inventive concept.

FIG. 28 illustrates an L2P mapping table 281 and block information 282, which are modified due to a namespace deletion operation, according to an exemplary embodiment of the inventive concept.

Referring to FIG. 28, the L2P mapping table 281 may include mapping information of first and third namespaces NS1 and NS3. For example, when a second namespace NS2 is deleted, an unmapping operation may be performed on mapping information of the second namespace NS2 in the L2P mapping table 281. Thus, LPN4 to LPN7, which have been allocated to the second namespace NS2, are no longer mapped to the first to fourth pages PAGE0 to PAGE3 of the second block BLK1.

Therefore, the first to fourth pages PAGE0 to PAGE3 of the second block BLK1 do not store valid data and are considered to store invalid data. Thus, since none of the first to fourth pages PAGE0 to PAGE3 of the second block BLK1, that is, of PBN1 are valid, a valid page count (VPC) for PBN1 is changed to 0. Since PBN1 does not include a valid page, the FTL may perform an erasure operation on PBN1, and PBN1 may become a free block by the erasure operation. The L2P mapping table 281 corresponds to a section 283 of the NVM including the first block BLK0, the second block BLK1, and the third block BLK2.

For example, when the first page PAGE0 of the second block BLK1, that is, of PBN1 is valid and the second to fourth pages PAGE1 to PAGE3 thereof are not valid, the valid page count (VPC) for PBN1 is changed to 1. Here, the FTL may write the first page PAGE0 of PBN1 to another arbitrary block and perform an erasure operation on PBN1, and PBN1 may become a free block by the erasure operation.

Figure 29:
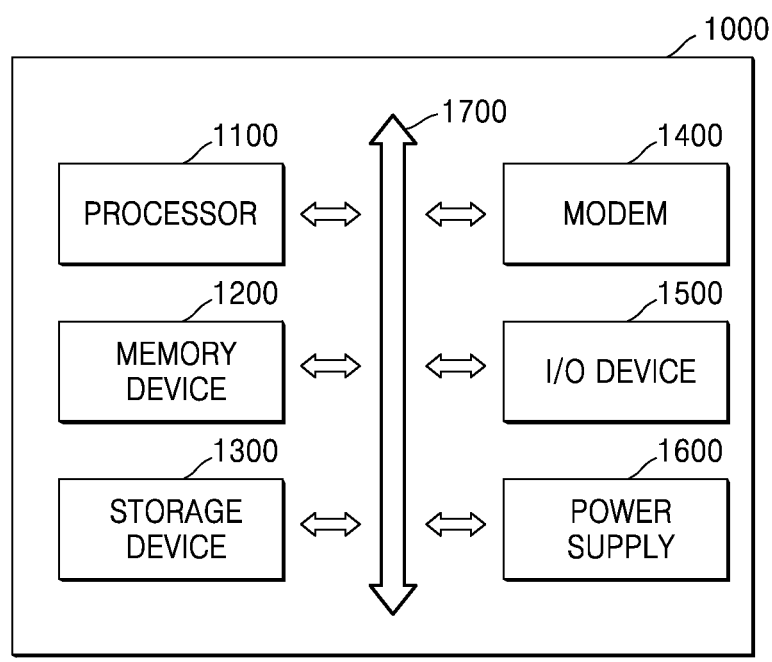
FIG. 29 is a block diagram illustrating an electronic device according to an exemplary embodiment of the inventive concept.

FIG. 29 is a block diagram illustrating an electronic device 1000 according to an exemplary embodiment of the inventive concept.

Referring to FIG. 29, the electronic device 1000 includes a processor 1100, a memory device 1200, a storage device 1300, a modem 1400, an input/output device 1500, and a power supply 1600. In this embodiment, the storage device 1300 supports a namespace function and manages a multi-namespace. The storage device 1300 may dynamically create or delete a namespace in response to a namespace creation or deletion request, and may update a mapping table according to the creation or deletion of the namespace. The descriptions made with reference to FIGS. 1 to 28 may be applied to the storage device 1300.

While the inventive concept has been particularly shown and described with reference to embodiments thereof, it will be understood that various changes in form and details may be made therein without departing from the spirit and scope of the inventive concept.

What is claimed is:

1. A method of operating a storage device managing a multi-namespace, the method comprising:
storing first mapping information including a mapping between a first logical address space and a first physical address space to a mapping table, in response to a request to create a first namespace, the first logical address space being allocated to the first namespace; and
storing second mapping information including a mapping between a second logical address space and a second physical address space to the mapping table, in response to a request to create a second namespace, the second logical address space being allocated to the second namespace and being contiguous to the first logical address space,
wherein the mapping table includes a first region for the first namespace and a second region for the second namespace that is contiguous to the first region,
wherein the first region comprises a plurality of first entries, where each first entry maps a logical page number of the first logical address space directly to a physical page number of the first physical address space, and
wherein the second region comprises a plurality of second entries, where each second entry maps a logical page number of the second logical address space directly to a physical page number of the second physical address space,
wherein the method further comprises:
relocating the first and second mapping information in the mapping table, in response to a request to delete the first namespace; and
performing an unmapping operation on the first mapping information in the mapping table such that data stored in the first physical address space is invalidated, after the relocating of the first and second mapping information.

2. The method according to claim 1, wherein a sum of the first and second logical address spaces is equal to or less than a storage capacity of the storage device.

3. The method according to claim 1, wherein the relocating of the first and second mapping information comprises allocating the first logical address space to the second namespace, and updating the mapping table such that the second physical address space corresponds to the first logical address space.

4. The method according to claim 1, wherein the storage device comprises a volatile memory and a non-volatile memory, and the relocating of the first and second mapping information comprises:
relocating the first and second mapping information in the mapping table stored in the non-volatile memory to generate a modified mapping table; and
loading the modified mapping table into the volatile memory.

5. The method according to claim 4, wherein the relocating of the first and second mapping information further comprises storing the mapping table loaded into the volatile memory to the non-volatile memory, before the loading of the modified mapping table.

6. The method according to claim 5, wherein the relocating of the first and second mapping information further comprises storing the modified mapping table to the non-volatile memory, after the loading of the modified mapping table.

7. The method according to claim 1, wherein the relocating of the first and second mapping information comprises:
performing an unmapping operation on the first mapping information in the mapping table; and
modifying the mapping table by copying the second mapping information into the first logical address space in the mapping table to generate a modified mapping table.

8. The method according to claim 7, wherein the storage device comprises a non-volatile memory, and the relocating of the first and second mapping information further comprises storing the modified mapping table to the non-volatile memory.

9. The method according to claim 1, further comprising:
determining whether a contiguous logical address space in a logical address space of the storage device is insufficient, in response to a request to delete the first namespace; and
relocating the first and second mapping information in the mapping table, when the contiguous logical address space is determined to be insufficient.

10. The method according to claim 1, further comprising:
performing an unmapping operation on the second mapping information in the mapping table such that data stored in the second physical address space is invalidated, in response to a request to delete the second namespace.

11. The method according to claim 1, further comprising:
storing third mapping information including a mapping between a third logical address space and a third physical address space to the mapping table, in response to a request to create a third namespace, the third logical address space being allocated to the third namespace and being contiguous to the second logical address space.

12. The method according to claim 11, wherein a sum of the first to third logical address spaces is equal to or less than a storage capacity of the storage device.

13. The method according to claim 11, further comprising:
relocating the second and third mapping information in the mapping table, in response to a request to delete the second namespace.

14. The method according to claim 13, wherein the relocating of the second and third mapping information comprises allocating the second logical address space to the third namespace such that the third namespace has a logical address space contiguous to the first logical address space, and updating the mapping table such that the third physical address space corresponds to the second logical address space.

15. A method of operating a storage device managing a multi-namespace, the method comprising:
respectively allocating first and second logical address spaces contiguous to each other to first and second namespaces and storing first and second mapping information regarding the respective first and second logical address spaces to a mapping table, in response to a request to create the first and second namespaces;
relocating the first mapping information and the second mapping information in the mapping table, in response to a request to delete the first namespace; and
performing an unmapping operation on the first mapping information in the mapping table, after the relocating of the first mapping information and the second mapping information.

16. The method according to claim 15, wherein the relocating of the first mapping information and the second mapping information comprises allocating the first logical address space to the second namespace, and updating the mapping table.

17. A method of operating a storage device managing a multi-namespace, the method comprising:
managing a mapping table to indicate such that first, second, and third namespaces have contiguous logical address spaces; and
updating the mapping table to indicate that the first and third namespaces have contiguous logical address spaces, in response to a request to delete the second namespace,
wherein the updated mapping table includes a first region for the first namespace and a second region for the third namespace that is contiguous to the first region,
wherein the first region comprises a plurality of first entries, where each first entry maps a logical page number of a first one of the logical address spaces directly to a physical address, and
wherein the second region comprises a plurality of second entries, where each second entry maps a logical page number of the remaining logical address spaces directly to a physical address,
wherein the method further comprises:
performing an unmapping operation on mapping information of the second namespace, in mapping table, after the updating of the mapping table.

* * * * *